(12) United States Patent
Gauthier et al.

(10) Patent No.: US 7,532,355 B2
(45) Date of Patent: May 12, 2009

(54) METHOD AND SYSTEM FOR MERGING VARIABLE TEXT AND IMAGES INTO BITMAPS DEFINED BY A PAGE DESCRIPTION LANGUAGE

(75) Inventors: Forrest P. Gauthier, Maineville, OH (US); James R. Walker, Maineville, OH (US)

(73) Assignee: Tesseron Ltd., Cincinnati, OH (US)

( * ) Notice: Subject to any disclaimer, the term of this patent is extended or adjusted under 35 U.S.C. 154(b) by 560 days.

(21) Appl. No.: 11/226,049

(22) Filed: Sep. 14, 2005

(65) Prior Publication Data

US 2008/0018935 A1 Jan. 24, 2008

Related U.S. Application Data

(63) Continuation of application No. 09/874,895, filed on Jun. 5, 2001, now abandoned, which is a continuation of application No. 09/291,121, filed on Apr. 14, 1999, now Pat. No. 6,243,172, which is a continuation-in-part of application No. 08/896,899, filed on Jul. 18, 1997, now Pat. No. 5,937,153, which is a continuation-in-part of application No. 08/373,582, filed on Jan. 18, 1995, now Pat. No. 5,729,665.

(51) Int. Cl.
*G06K 15/00* (2006.01)
*G06F 15/00* (2006.01)
(52) U.S. Cl. ..................... 358/1.18; 358/1.1
(58) Field of Classification Search ............... 358/1.1, 358/1.9, 1.15, 1.17, 1.18, 448, 467, 470; 382/164, 191, 318; 345/619, 554, 620, 641, 345/537; 707/1; 715/908, 911, 513, 521
See application file for complete search history.

(56) References Cited

U.S. PATENT DOCUMENTS 3,576,367 A 4/1971 Sable
3,744,899 A 7/1973 Sable
4,085,445 A 4/1978 Blevins et al.
4,203,154 A 5/1980 Lampson et al.
4,250,976 A 2/1981 Mochida (Continued)

FOREIGN PATENT DOCUMENTS

CA 2210405 7/1996

(Continued)

OTHER PUBLICATIONS

PCT International Search Report for International Application No. PCT/US99/26440. May 7, 2000.

(Continued)

*Primary Examiner*—Gabriel I Garcia
(74) *Attorney, Agent, or Firm*—MacMillan, Sobanski & Todd, LLC

(57) ABSTRACT

A computer implemented method for generating a plurality of bitmaps suitable for high-speed printing includes the steps of: (a) providing a page description code specification that defines a data area and at least one graphical attribute associated with the data area, where the graphical attribute defines the appearance of at least a portion of data associated with the data area; (b) interpreting the page description code specification, and during this interpretation, identifying the data area defined by the page description code specification; (c) storing the graphical attribute associated with the data area upon identification of the data area in step (b); (d) retrieving an object bitmap; (e) applying the stored graphical attribute to the object bitmap to generate a bitmap suitable for high-speed printing; and (g) repeating steps (d) and (e) to create a plurality of bitmaps suitable for high-speed printing such that the stored graphical attribute is applied repeatedly in the generation of the plurality of the bitmaps suitable for high-speed printing.

22 Claims, 8 Drawing Sheets

U.S. PATENT DOCUMENTS

| | | |
|---|---|---|
| 4,268,164 A | 5/1981 | Yajima et al. |
| 4,300,206 A | 11/1981 | Belleson et al. |
| 4,314,357 A | 2/1982 | Kimura et al. |
| 4,322,157 A | 3/1982 | Miura et al. |
| 4,417,322 A | 11/1983 | Berry et al. |
| 4,441,829 A | 4/1984 | Hebert, Jr. et al. |
| 4,445,795 A | 5/1984 | Levine et al. |
| 4,454,576 A | 6/1984 | McInroy et al. |
| 4,460,975 A | 7/1984 | Torkelsen et al. |
| 4,470,129 A | 9/1984 | Disbrow et al. |
| 4,493,049 A | 1/1985 | Donohue et al. |
| 4,509,826 A | 4/1985 | Araghi |
| 4,539,653 A | 9/1985 | Bartlett et al. |
| 4,553,860 A | 11/1985 | Imaizumi et al. |
| 4,651,278 A | 3/1987 | Herzog et al. |
| 4,677,551 A | 6/1987 | Suganuma |
| 4,718,784 A | 1/1988 | Drisko |
| 4,723,209 A | 2/1988 | Hernandez et al. |
| 4,723,210 A | 2/1988 | Barker et al. |
| 4,723,211 A | 2/1988 | Barker et al. |
| 4,739,477 A | 4/1988 | Barker et al. |
| 4,745,415 A | 5/1988 | Konda et al. |
| 4,745,560 A | 5/1988 | Decker et al. |
| 4,770,972 A | 9/1988 | Nelson et al. |
| 4,771,340 A | 9/1988 | Notermans |
| 4,809,220 A | 2/1989 | Carlson et al. |
| 4,825,251 A | 4/1989 | Nelson et al. |
| 4,826,333 A | 5/1989 | Tanaka |
| 4,839,814 A | 6/1989 | Steidel |
| 4,857,955 A | 8/1989 | Crandall |
| 4,862,386 A | 8/1989 | Axelrod et al. |
| 4,864,516 A | 9/1989 | Gaither et al. |
| 4,870,611 A | 9/1989 | Martin et al. |
| 4,903,067 A | 2/1990 | Murayama et al. |
| 4,903,229 A | 2/1990 | Schmidt et al. |
| 4,912,491 A | 3/1990 | Hoshino et al. |
| 4,933,880 A | 6/1990 | Borgendale et al. |
| 4,937,664 A | 6/1990 | Chiku et al. |
| 4,939,674 A | 7/1990 | Price et al. |
| 4,944,614 A | 7/1990 | Tanaka |
| 4,953,105 A | 8/1990 | Hirata et al. |
| 4,959,769 A | 9/1990 | Cooper et al. |
| 4,963,459 A | 10/1990 | Beery et al. |
| 4,963,899 A | 10/1990 | Resch, III |
| 4,965,597 A | 10/1990 | Ohigashi et al. |
| 4,965,748 A | 10/1990 | Chang et al. |
| 4,969,093 A | 11/1990 | Barker et al. |
| 4,992,956 A | 2/1991 | Kaku et al. |
| 4,994,968 A | 2/1991 | Kato et al. |
| 4,996,662 A | 2/1991 | Cooper et al. |
| 5,001,653 A | 3/1991 | Buchanan et al. |
| 5,021,975 A | 6/1991 | Yamanashi |
| 5,025,396 A | 6/1991 | Parks et al. |
| 5,029,327 A | 7/1991 | Nureki |
| 5,033,009 A | 7/1991 | Dubnoff |
| 5,043,749 A | 8/1991 | Punater et al. |
| 5,050,101 A | 9/1991 | Kiuchi et al. |
| 5,060,980 A | 10/1991 | Johnson et al. |
| 5,067,024 A | 11/1991 | Anzai |
| 5,077,795 A | 12/1991 | Rourke et al. |
| 5,078,748 A | 1/1992 | Akram et al. |
| 5,084,831 A | 1/1992 | Morikawa et al. |
| 5,103,490 A | 4/1992 | McMillin |
| 5,104,245 A | 4/1992 | Oguri et al. |
| 5,107,423 A | 4/1992 | Sasaki et al. |
| 5,134,669 A | 7/1992 | Keogh et al. |
| 5,136,316 A | 8/1992 | Punater et al. |
| 5,139,003 A | 8/1992 | Ohhashi et al. |
| 5,142,667 A | 8/1992 | Dimperio et al. |
| 5,143,362 A | 9/1992 | Doane et al. |
| 5,148,366 A | 9/1992 | Buchanan et al. |
| 5,150,455 A | 9/1992 | Morikawa et al. |
| 5,157,765 A | 10/1992 | Birk et al. |
| 5,157,767 A | 10/1992 | Nihei |
| 5,157,773 A | 10/1992 | Matsumoto et al. |
| 5,173,853 A | 12/1992 | Kelly et al. |
| 5,181,162 A | 1/1993 | Smith et al. |
| 5,191,429 A | 3/1993 | Rourke |
| 5,202,206 A | 4/1993 | Tam |
| 5,204,916 A | 4/1993 | Hamilton, Jr. et al. |
| 5,204,946 A | 4/1993 | Shimamura |
| 5,206,951 A | 4/1993 | Khoyi et al. |
| 5,208,906 A | 5/1993 | Morgan |
| 5,218,539 A | 6/1993 | Elphick et al. |
| 5,222,211 A | 6/1993 | Mueller et al. |
| 5,222,235 A | 6/1993 | Hintz et al. |
| 5,222,236 A | 6/1993 | Potash et al. |
| 5,226,161 A | 7/1993 | Khoyi et al. |
| 5,231,698 A | 7/1993 | Forcier |
| 5,235,654 A | 8/1993 | Anderson et al. |
| 5,237,655 A | 8/1993 | Statt et al. |
| 5,239,625 A | 8/1993 | Bogart et al. |
| 5,241,464 A | 8/1993 | Greulich et al. |
| 5,243,518 A | 9/1993 | Holt et al. |
| 5,257,097 A | 10/1993 | Pineau et al. |
| 5,261,047 A | 11/1993 | Rivshin |
| 5,267,155 A | 11/1993 | Buchanan et al. |
| 5,276,799 A | 1/1994 | Rivshin |
| 5,280,574 A | 1/1994 | Mizuta et al. |
| 5,282,269 A | 1/1994 | Willems et al. |
| 5,287,128 A | 2/1994 | Doane et al. |
| 5,287,444 A | 2/1994 | Enescu et al. |
| 5,290,109 A | 3/1994 | Midorikawa |
| 5,291,243 A | 3/1994 | Heckman et al. |
| 5,297,217 A | 3/1994 | Hamilton, Jr. et al. |
| 5,303,341 A | 4/1994 | Rivshin |
| 5,303,379 A | 4/1994 | Khoyi et al. |
| 5,307,266 A | 4/1994 | Hayashi et al. |
| 5,307,458 A | 4/1994 | Freiburg et al. |
| 5,309,558 A | 5/1994 | Rourke et al. |
| 5,315,693 A | 5/1994 | Hirosawa |
| 5,317,646 A | 5/1994 | Sang, Jr. et al. |
| 5,319,748 A | 6/1994 | Motoyama |
| 5,323,217 A | 6/1994 | Christy et al. |
| 5,323,312 A | 6/1994 | Saito et al. |
| 5,325,484 A | 6/1994 | Motoyama |
| 5,327,341 A | 7/1994 | Whalen et al. |
| 5,328,092 A | 7/1994 | File |
| 5,329,616 A | 7/1994 | Silverbrook |
| 5,339,240 A | 8/1994 | Beaverson |
| 5,349,647 A | 9/1994 | Freiburg et al. |
| 5,353,388 A | 10/1994 | Motoyama |
| 5,355,493 A | 10/1994 | Silberbauer et al. |
| 5,360,277 A | 11/1994 | Matsubara et al. |
| 5,367,673 A | 11/1994 | Goldsmith et al. |
| 5,368,334 A | 11/1994 | Christy et al. |
| 5,375,204 A | 12/1994 | Motoyama et al. |
| 5,379,368 A | 1/1995 | Imai et al. |
| 5,379,373 A | 1/1995 | Hayashi et al. |
| 5,384,886 A | 1/1995 | Rourke |
| 5,384,901 A | 1/1995 | Glassner et al. |
| 5,404,294 A | 4/1995 | Karnik |
| 5,412,566 A | 5/1995 | Sawa |
| 5,416,849 A | 5/1995 | Huang |
| 5,416,896 A | 5/1995 | Motoyama |
| 5,420,696 A | 5/1995 | Wegeng et al. |
| 5,420,974 A | 5/1995 | Morris et al. |
| 5,421,015 A | 5/1995 | Khoyi et al. |
| 5,422,992 A | 6/1995 | Motoyama et al. |
| 5,425,140 A | 6/1995 | Bloomfield et al. |
| 5,436,627 A | 7/1995 | Motoyama et al. |
| 5,437,038 A | 7/1995 | Silberbauer et al. |
| 5,438,650 A | 8/1995 | Motoyama et al. |
| 5,440,745 A | 8/1995 | Platte et al. |

| | | | | | | |
|---|---|---|---|---|---|---|
| 5,446,837 A | 8/1995 | Motoyama et al. | | 5,781,711 A | 7/1998 | Austin et al. |
| 5,446,842 A | 8/1995 | Schaeffer et al. | | 5,793,946 A | 8/1998 | Gauthier et al. |
| 5,448,685 A | 9/1995 | Ogura et al. | | 5,796,411 A | 8/1998 | Cyman et al. |
| 5,448,691 A | 9/1995 | Motoyama | | 5,796,930 A | 8/1998 | Gauthier et al. |
| 5,450,537 A | 9/1995 | Hirai et al. | | 5,801,716 A | 9/1998 | Silverbrook |
| 5,450,541 A | 9/1995 | Rourke et al. | | 5,832,530 A | 11/1998 | Paknad et al. |
| 5,451,111 A | 9/1995 | Matsuhisa | | 5,833,375 A | 11/1998 | Gauthier et al. |
| 5,452,094 A | 9/1995 | Ebner et al. | | 5,841,420 A | 11/1998 | Kaply et al. |
| 5,455,599 A | 10/1995 | Cabral et al. | | 5,852,673 A | 12/1998 | Young |
| 5,455,945 A | 10/1995 | VanderDrift | | 5,866,286 A | 2/1999 | Christy et al. |
| 5,458,284 A | 10/1995 | Haan et al. | | 5,877,865 A | 3/1999 | Fukuta |
| 5,459,819 A | 10/1995 | Watkins et al. | | 5,880,742 A | 3/1999 | Rao et al. |
| 5,459,826 A | 10/1995 | Archibald | | 5,895,455 A | 4/1999 | Bellinger et al. |
| 5,465,165 A | 11/1995 | Tanio et al. | | 5,896,462 A | 4/1999 | Stern |
| 5,467,448 A | 11/1995 | Hilton et al. | | 5,900,003 A | 5/1999 | Ben Dror |
| 5,483,623 A | 1/1996 | Nagashima | | 5,915,258 A | 6/1999 | Toyokura |
| 5,483,624 A | 1/1996 | Christopher et al. | | 5,920,685 A | 7/1999 | Romano et al. |
| 5,483,629 A | 1/1996 | Motoyama et al. | | 5,926,185 A * | 7/1999 | Vyncke et al. ............... 345/619 |
| 5,487,165 A | 1/1996 | Tsay et al. | | 5,937,153 A | 8/1999 | Gauthier |
| 5,490,243 A | 2/1996 | Millman et al. | | 5,946,461 A | 8/1999 | Landry et al. |
| 5,493,634 A | 2/1996 | Bonk et al. | | 5,949,438 A | 9/1999 | Cyman et al. |
| 5,495,565 A | 2/1996 | Millard et al. | | 5,953,007 A | 9/1999 | Center et al. |
| 5,499,329 A | 3/1996 | Motoyama et al. | | 5,960,164 A | 9/1999 | Dorfman et al. |
| 5,500,928 A | 3/1996 | Cook et al. | | 5,963,968 A | 10/1999 | Warmus et al. |
| 5,502,796 A | 3/1996 | Takahashi | | 5,982,994 A | 11/1999 | Mori et al. |
| 5,504,843 A | 4/1996 | Catapano et al. | | 5,983,243 A | 11/1999 | Heiney et al. |
| 5,504,891 A | 4/1996 | Motoyama et al. | | 5,987,461 A | 11/1999 | Dreyer et al. |
| 5,506,697 A | 4/1996 | Li et al. | | 6,006,242 A | 12/1999 | Poole et al. |
| 5,506,985 A | 4/1996 | Motoyama et al. | | 6,006,281 A | 12/1999 | Edmunds |
| 5,521,710 A | 5/1996 | Strossman et al. | | 6,009,442 A | 12/1999 | Chen et al. |
| 5,532,100 A | 7/1996 | Christy et al. | | 6,016,380 A | 1/2000 | Norton |
| 5,535,318 A | 7/1996 | Motoyama et al. | | 6,018,774 A | 1/2000 | Mayle et al. |
| 5,539,529 A | 7/1996 | Merchant | | 6,020,894 A | 2/2000 | Silverbrook |
| 5,542,052 A | 7/1996 | Deutsch et al. | | 6,027,195 A | 2/2000 | Gauthier et al. |
| 5,544,287 A | 8/1996 | Roth | | 6,049,390 A | 4/2000 | Notredame et al. |
| 5,546,577 A | 8/1996 | Marlin et al. | | 6,064,397 A * | 5/2000 | Herregods et al. .......... 345/630 |
| 5,548,687 A | 8/1996 | Motoyama | | 6,078,403 A | 6/2000 | Palmer |
| 5,559,933 A | 9/1996 | Boswell | | 6,078,406 A | 6/2000 | Nickerson |
| 5,563,987 A | 10/1996 | Scott | | 6,145,946 A | 11/2000 | Gauthier et al. |
| 5,563,998 A | 10/1996 | Yaksich et al. | | 6,146,027 A | 11/2000 | Orton et al. |
| 5,563,999 A | 10/1996 | Yaksich et al. | | 6,209,010 B1 | 3/2001 | Gauthier et al. |
| 5,587,800 A | 12/1996 | Miyazaki | | 6,236,463 B1 | 5/2001 | Cyman et al. |
| 5,592,683 A | 1/1997 | Chen et al. | | 6,243,172 B1 | 6/2001 | Gauthier et al. |
| 5,594,860 A | 1/1997 | Gauthier | | 6,290,406 B1 | 9/2001 | Gauthier et al. |
| 5,600,768 A | 2/1997 | Andresen | | 6,292,267 B1 | 9/2001 | Mori et al. |
| 5,611,024 A | 3/1997 | Campbell et al. | | 6,310,695 B1 | 10/2001 | Gauthier et al. |
| 5,611,035 A * | 3/1997 | Hall ........................... 345/440 | | 6,326,983 B1 | 12/2001 | Venable et al. |
| 5,615,316 A | 3/1997 | Imai et al. | | 6,327,599 B1 | 12/2001 | Warmus et al. |
| 5,621,020 A | 4/1997 | Khatib et al. | | 6,330,073 B1 | 12/2001 | Sciatto |
| 5,634,091 A | 5/1997 | Sands et al. | | 6,332,149 B1 * | 12/2001 | Warmus et al. ............. 715/246 |
| 5,640,559 A | 6/1997 | Silberbauer et al. | | 6,381,028 B1 | 4/2002 | Gauthier |
| 5,640,577 A | 6/1997 | Scharmer | | 6,437,875 B1 | 8/2002 | Unno |
| 5,642,435 A | 6/1997 | Loris | | 6,446,100 B1 | 9/2002 | Warmus et al. |
| 5,668,897 A | 9/1997 | Stolfo | | 6,459,498 B2 | 10/2002 | Miyake et al. |
| 5,671,345 A | 9/1997 | Lhotak | | 6,465,165 B2 | 10/2002 | Landry-Coltrain et al. |
| 5,675,788 A | 10/1997 | Husick et al. | | 6,487,568 B1 | 11/2002 | Gauthier et al. |
| 5,680,615 A | 10/1997 | Marlin et al. | | 6,493,106 B1 | 12/2002 | Gauthier et al. |
| 5,689,625 A | 11/1997 | Austin et al. | | 6,505,980 B1 | 1/2003 | Allday |
| 5,706,365 A | 1/1998 | Rangarajan et al. | | 6,557,017 B1 | 4/2003 | Venable |
| 5,717,840 A | 2/1998 | Pardo | | 6,597,467 B2 | 7/2003 | Miyake et al. |
| 5,727,220 A | 3/1998 | Hohensee et al. | | 6,599,325 B2 | 7/2003 | Gauthier et al. |
| 5,729,665 A | 3/1998 | Gauthier | | 6,684,188 B1 | 1/2004 | Mitchell et al. |
| 5,729,674 A | 3/1998 | Rosewarne et al. | | 6,687,016 B2 | 2/2004 | Gauthier |
| 5,734,915 A | 3/1998 | Roewer | | 6,707,572 B1 | 3/2004 | Walker et al. |
| 5,740,338 A | 4/1998 | Gauthier et al. | | 6,771,387 B2 | 8/2004 | Gauthier |
| 5,745,910 A | 4/1998 | Piersol et al. | | 2002/0089681 A1 | 7/2002 | Gauthier |
| 5,754,750 A | 5/1998 | Butterfield et al. | | 2002/0122205 A1 | 9/2002 | Gauthier |
| 5,758,074 A | 5/1998 | Marlin et al. | | 2002/0149792 A1 | 10/2002 | Gauthier et al. |
| 5,760,914 A | 6/1998 | Gauthier et al. | | 2003/0050934 A1 | 3/2003 | Gauthier et al. |
| 5,765,006 A | 6/1998 | Motoyama | | 2004/0130752 A1 | 7/2004 | Gauthier |
| 5,765,874 A | 6/1998 | Chanenson et al. | | 2004/0141197 A1 | 7/2004 | Gauthier |
| 5,768,488 A | 6/1998 | Stone et al. | | 2005/0076001 A1 | 4/2005 | Gauthier et al. |
| 5,778,377 A | 7/1998 | Marlin et al. | | 2005/0185212 A1 | 8/2005 | Gauthier |

| | | |
|---|---|---|
| 2005/0286065 A1 | 12/2005 | Gauthier et al. |

FOREIGN PATENT DOCUMENTS

| | | |
|---|---|---|
| CA | 2207840 | 12/1997 |
| CA | 2215094 | 4/1998 |
| DE | 4313958 A1 | 11/1993 |
| DE | 4313959 A1 | 11/1993 |
| DE | 4316282 A1 | 11/1994 |
| DE | 4313958 C2 | 8/1998 |
| DE | 4313959 C2 | 8/1998 |
| EP | 0075732 A2 | 4/1983 |
| EP | 0131966 A2 | 1/1985 |
| EP | 0075732 B1 | 8/1987 |
| EP | 0131966 B1 | 3/1990 |
| EP | 0394168 A2 | 10/1990 |
| EP | 0475601 A2 | 3/1992 |
| EP | 0478335 A2 | 4/1992 |
| EP | 0527097 A2 | 2/1993 |
| EP | 0538059 A2 | 4/1993 |
| EP | 0539135 A2 | 4/1993 |
| EP | 0539135 A3 | 7/1993 |
| EP | 0594370 A1 | 4/1994 |
| EP | 0614156 A1 | 9/1994 |
| EP | 0527097 A3 | 3/1995 |
| EP | 0703524 A1 | 3/1996 |
| EP | 0703524 B1 | 1/1997 |
| EP | 0394168 B1 | 6/1997 |
| EP | 0475601 B1 | 10/1997 |
| EP | 0539135 B1 | 12/1997 |
| EP | 0837401 A2 | 4/1998 |
| EP | 0538059 B1 | 4/1999 |
| EP | 0594370 B1 | 1/2000 |
| EP | 1011981 A1 | 6/2000 |
| EP | 1132809 A2 | 9/2001 |
| EP | 0837401 B1 | 2/2003 |
| EP | 1132809 B1 | 1/2004 |
| GB | 2220511 A | 1/1990 |
| JP | 56157369 A | 12/1981 |
| JP | 58108045 A | 6/1983 |
| JP | 58224755 A | 12/1983 |
| JP | 59068244 A | 4/1984 |
| JP | 59068277 A | 4/1984 |
| JP | 60073869 A | 4/1985 |
| JP | 60145865 A | 8/1985 |
| JP | 61018802 A | 1/1986 |
| JP | 61118775 A | 6/1986 |
| JP | 61130067 A | 6/1986 |
| JP | 61179463 A | 8/1986 |
| JP | 61223935 A | 10/1986 |
| JP | 61254369 A | 11/1986 |
| JP | 62065126 A | 3/1987 |
| JP | 62207664 A | 9/1987 |
| JP | 62261467 A | 11/1987 |
| JP | 63039085 A | 2/1988 |
| JP | 63108428 A | 5/1988 |
| JP | 63271275 A | 11/1988 |
| JP | 63300259 A | 12/1988 |
| JP | 63300260 A | 12/1988 |
| JP | 63300263 A | 12/1988 |
| JP | 1133051 A | 5/1989 |
| JP | 1141746 A | 6/1989 |
| JP | 1142674 A | 6/1989 |
| JP | 1142675 A | 6/1989 |
| JP | 1142680 A | 6/1989 |
| JP | 2112017 A | 4/1990 |
| JP | 3091064 A | 4/1991 |
| JP | 3121870 A | 5/1991 |
| JP | 4059372 A | 2/1992 |
| JP | 5016450 A | 1/1993 |
| JP | 5031997 A | 2/1993 |
| JP | 5057967 A | 3/1993 |
| JP | 5119937 A | 5/1993 |
| JP | 5246104 A | 9/1993 |
| JP | 5270093 A | 10/1993 |
| JP | 5298037 A | 11/1993 |
| JP | 5338313 A | 12/1993 |
| JP | 6032015 A | 2/1994 |
| JP | 6035632 A | 2/1994 |
| JP | 6099635 A | 4/1994 |
| JP | 6106810 A | 4/1994 |
| JP | 6125454 A | 5/1994 |
| JP | 6171176 A | 6/1994 |
| JP | 6171177 A | 6/1994 |
| JP | 6238982 A | 8/1994 |
| JP | 6340129 A | 12/1994 |
| JP | 7064981 A | 3/1995 |
| JP | 3048582 B2 | 3/2000 |
| WO | WO9502224 A1 | 1/1995 |
| WO | WO9622573 A1 | 7/1996 |
| WO | WO9718514 A1 | 5/1997 |
| WO | WO9808176 A1 | 2/1998 |
| WO | WO9821044 A1 | 5/1998 |
| WO | WO0028435 A2 | 5/2000 |
| WO | WO0028435 A3 | 10/2000 |

OTHER PUBLICATIONS

Adobe Developer Support. Emulation of the Execform Operator. Technical Note #5113. Mar. 31, 1992.

Adobe Developer Support. Using EPS Files in PostScript Language Forms. Technical Note #5144. Oct. 4, 1996.

Adobe Systems Inc. PostScript Language Program Design. Feb. 1988.

Adobe Systems Inc. PostScript Language Reference Manual. 2nd edition. 1990. pp. 16, 17,55, 56, 146, 147, 157, 158, 172 & 173.

GMC Digital Systems AG. Print Bar DLL PBAR0004 Code 39 Technical Guidelines. Apr. 7, 1993.

GMC Digital Systems AG. Print Bar DLL PBAR0006 Code 128 Technical Guidelines. Apr. 7, 1993.

GMC Digital Systems AG. Print Layout—A Short Overview vol. 1. Dec. 1990.

GMC Digital Systems AG. PrintManager V 2.1 für PrintRobot Installation. Jun. 15, 1994.

GMC Digital Systems AG. PrintManager V 2.11 for Print Robot Operating Manual. Sep. 1, 1994.

GMC Digital Systems AG. PrintNet Brochures.

GMC Digital Systems AG. PrintNet PrintBar Operating Manual. Feb. 26, 1993.

GMC Digital Systems AG. PrintNet PrintBar V1.01 User Manual. Aug. 23, 1994.

GMC Digital Systems AG. PrintNet PrintFont for Windows Operating Manual. Mar. 29, 1993.

GMC Digital Systems AG. PrintNet PrintFont V2.1 User Manual. Oct. 26, 1994.

GMC Digital Systems AG. PrintNet PrintImage User Manual. Oct. 26, 1994.

GMC Digital Systems AG. PrintNet PrintLayout Operating Manual. Feb. 26, 1993.

GMC Digital Systems AG. PrintNet PrintLayout II Bedienungsanleitung. Mar. 31, 1993.

GMC Digital Systems AG. PrintNet PrintLayout II Operating Manual. Jul. 4, 1994.

GMC Digital Systems AG. PrintNet PrintLayout V2.1 Operating Manual. Oct. 26, 1994.

GMC Digital Systems AG. PrintNet PrintJob V2.02 User Manual. Oct. 26, 1993.

GMC Digital Systems AG. PrintNet PrintJob V2.04 User Manual. Sep. 5, 1994.

GMC Digital Systems AG. PrintNet PrintNumbers V.1.1 Operating Manual. Jul. 4, 1994.

GMC Digital Systems AG. PrintNet PrintNumbers Operating Manual. Oct. 26, 1994.

GMC Digital Systems AG. PrintRobot Printmanager V2.00 β Bedienungsanleitung. Feb. 17, 1993.

GMC Digital Systems AG. PrintRobot Printmanager Installation. Feb. 17, 1993.
GMC Digital Systems AG. PrintRobot: A European Première.
GMC Digital Systems AG. PrintManager V 2.1 für PrintRobot Bedienungsanleitung. Mar. 15, 1994.
GMC Digital Systems AG. Print Bar DLL PBAR0002 Code 2/5 Interleaved Technical Guidelines. Mar. 12, 1993.
IDG InfoWorld, Mar. 20, 1995, Product Reviews; Desktop publishing software; p. 92.
IDG InfoWorld, Oct. 9, 1995, Review, p. 91.
IDG InfoWorld, May 9, 1994, Review; p. 98.
Interquest, Ltd. FreeFlow Variable Information Workflow (white paper). 2004.
Labels & Labels. *New Generation of Digitial Label Press Technology Available*. May/Jun. 1986.
McGilton, Henry and Campione, Mary. PostScript By Example. 1992. pp. 463-470.
McGraw-Hill, Inc., Business Week: *Information Processing: Data Processing*. Industrial Edition Jun. 9, 1980.
McGraw-Hill, Inc., Business Week: *Product Design*. Industrial Edition. Jun. 20, 1977.
McGraw-Hill, Inc., IBM Dictionary of Computing; George McDaniel. 10th edition. 1993. p. 63.
Microsoft Press. Computer Dictionary. 3rd edition. 1997. pp. 53, 72, & 356.
oxford University Press, Dictionary of Computing: Defination of: "Page Description Language". 4th edition. 1996. p. 352.
Press Information Drupa '86. *GMC PrintRobot, the revolutionary new printing technology*. 1986.
Adobe Systems Inc. PostScript Language Reference Manual. 3rd edition. 2002.
Adobe Systems Inc. PostScript language Tutorial and Cookbook. 1985.
Holzgang, David A. Understanding PostScript Programming. 3rd ed. 1992. pp. 268-269.
IBM Corp. *Attribute Specification in a Structured Data Stream*. IBM Technical Disclosure Bulletin [online]. Jan. 18, 1995 [retrieved Nov. 20, 2006]. Retrieved from the Internet: <URL: http://www.IP.com>.
IBM Corp. *Document Environment Hierarchy*. IBM Technical Disclosure Bulletin. Sep. 1, 1988.
IBM Corp. *Dynamic Repositioning of Object Areas on a Page*. IBM Technical Disclosure Bulletin, vol. 32, No. IOB. Mar. 1990.
IBM Corp. *Enhanced Technique for Merging Data From a Second Document*. IBM Technical Disclosure Bulletin, vol. 30, No. 5. Oct. 1987.
IBM Corp. *Enhanced Data Merge Source For Shell Document*. IBM Technical Disclosure Bulletin, vol. 32, No. 12, May 1990.
IBM Corp. *Form Overlay Print System Using Postscript*. IBM Technical Disclosure Bulletin [online], vol. 39 No. 2. [retrieved Nov. 20, 2006]. Retrieved from the Internet:<URL: http://www.ip.com>.
IBM Corp. *Identifying and Optimizing PostScript Variable Data*. IBM Technical Disclosure Bulletin [online], vol. 40 No. 9. [retrieved Nov. 20, 2006]. Retrieved from the Internet:<URL: http://www.IP.com>.
IBM Corp. *Improved Technique for Printing Multi-Copy Documents*. IBM Technical Disclosure Bulletin, vol. 29, No. 1. Jun. 1986.
IBM Corp. *Method for Automatically Printing Variable Content Labels On-Line*. IBM Technical Disclosure Bulletin, vol. 33, No. 8. Jan. 1991.
IBM Corp. *Method for Combining Variable and Fixed Print Data in a Print Image*. IBM Technical Disclosure Bulletin [online], vol. 36, No. 10. Oct. 1993 [retrieved Nov. 20, 2006]. Retrieved from the Internet:<URL: http://www.IP.com>.
IBM Corp. *Method for Joining Documents for Printing in a Personal Computer System*. IBM Technical Disclosure Bulletin, vol. 29 No. 7. Dec. 1986.
IBM Corp. *Method to Merge Table data Using One-Cell Table Objects*. IBM Technical Disclosure Bulletin, Document No. 86A 61235/85-130 P200/AT8840660. May 1986.
IBM Corp. *Registered Name Identification and Variable Names*. IBM Technical Disclosure Bulletin, vol. 32, No. 9B. Feb. 1990.
IBM Corp. *Using PostScript Resources in Advanced Function Printing*. IBM Technical Disclosure Bulletin, vol. 38, No. 1. Jan. 1995 [retrieved Nov. 20, 2006]. Retrieved from the Internet:<URL: http://www.IP.com>.
IBM Corp. *Variable Paged Array Datatype*. IBM Technical Disclosure Bulletin, vol. 37, No. 7, Jul. 1994 [retrieved Nov. 20, 2006]. Retrieved from the Internet:<URL: http://www.IP.com>.
IBM Corp. *Word Processor Having Conditional Text Printing for Mass Mailings*. IBM Technical Disclosure Bulletin, vol. 29, No. 6. Nov. 1986 [retrieved Nov. 20, 2006]. Retrieved from the Internet:<URL: http://www.IP.com>.
Reid, Glenn C. Thinking in PostScript. 1990.
Sherman, John F. Taking Advantage of PostScript (1992).
Holzgang, David A. Understanding PostScript Programming. 1st edition. 1987. pp. 196-209, 210-225, 226-241 & 242-262.
Holzgang, David A. Understanding PostScript Programming. 2nd edition. 1988.
Holzgang, David A. Understanding PostScript. 3nd edition. 1992.
Introduction to Interscript. Sep. 19, 1985.
On the Supply Side. Editor and Publisher for Jul. 21, 1984.
Ricoh Company Ltd. Special Issue on Pattern Recognition and Natural Language Processing. Ricoh Technical Report. No. 15. 1986.
Roth, Stephen F. Real World PostScript: Techniques from PostScript Professionals. 1988. pp. 228-384.
McGilton, Henry and Campione, Mary. PostScript By Example. 1992.
Pfifther, Pamela. Inside the Publishing Revolution—The Adobe Story. 2003.
Seybold Interactive Report—Variable Data Products.
Smith, Ross. Learning PostScript: A Visual Approach. 1990.
Thomas, Barry. A Postscript Cookbook. 1988.
Adobe Systems Inc. Postscript Language Reference Manual Supplement for Version 2014, Mar. 10, 1994.
Adobe Systems Inc. PostScript Language Reference Manual. 1st edition. 1985.
Adobe Systems Inc. PostScript Language Reference Manual. 2nd edition. 1990. pp. 708-765.
Adobe Systems Inc. PostScript Language Reference Manual. 3rd edition. 1999. pp. 1-293.
Adobe Systems Inc. PostScript Language: Tutorial and Cookbook. 1986.
Adobe Systems Inc. Programming the Display PostScript System with NeXTstep. 1991. pp. 372-380.
Bhushan, Abhay & Plass, Michael, The Interpress page and document description language, Computer Magazine Jun. 1986.
Braswell, Frank Merritt. Inside PostScript. 1989. pp. 14-10—Appendix III-23.
Haxton, K. Xerox The Document Company: Variable Information Printing, *From 1977 to today, Leading in Information Age Printing*. 2005.
Holzgang, David A. Display PostScript Programming. 1990. pp. 225-325.
Notice of Prior Litigation Allegations. Jan. 2007.
Reid, Glenn C., Adobe Systems Inc. PostScript Language Program Design. 1998.
Xerox Corp. Technical Tutorial. Sep. 19, 2005.
Adobe Systems Inc. Programming the Display PostScript System with X. 1993.
Glover, Gary. Running PostScript from MS-DOS. 1st edition. 1989.
Harrington, Steven I. and Buckley, Robert R. Interpress—The Source Book. 1988.
Xerox Corp. Introduction to Interpress. Apr. 1994.
New High Speed Vans RIP Features Variable PostScript. The Hard Copy Observer, vol. 7, No. 2, Feb. 1997.
Spring, Michael B. and Dubin, David S. Hands-On PostScript. 1992.
Spring, Michael B. Electronic Printing and Publishing: The Document Processing Revolution. 1991.
Vollenwcider, Peter. Encapsulated PostScript: Application Guide for the Macintosh and PC's. 1990.
Wikipedia—The Free Encyclopedia. Definition of "DisplayWrite".

Xerox Corp. 9700-8700 Electronic Printing Systems Version 10 Software Advance Notice, Mike Muttera, El Segundo, Califonia Oct. 18, 1984.

Xerox Corp. 9700-8790 Laser Printing Systems Print Description Language Refence Version 3.9 Feb. 1994.

Xerox Corp. 9700 Electronic Printing System Forms Creation Guide 910001C Jan. 1979, El Segundo, Califonia Jun. 1977.

Xerox Corp. 9700 Electronic Printing System Forms Creation Guide, El Segundo, Califonia Jun. 1977.

Xerox Corp. 9700 Electronic Printing System Operator's Guide 600P81096-B, El Segundo, Califonia.

Xerox Corp. Interpress Electronic Printing Standard Jan. 1986.

* cited by examiner

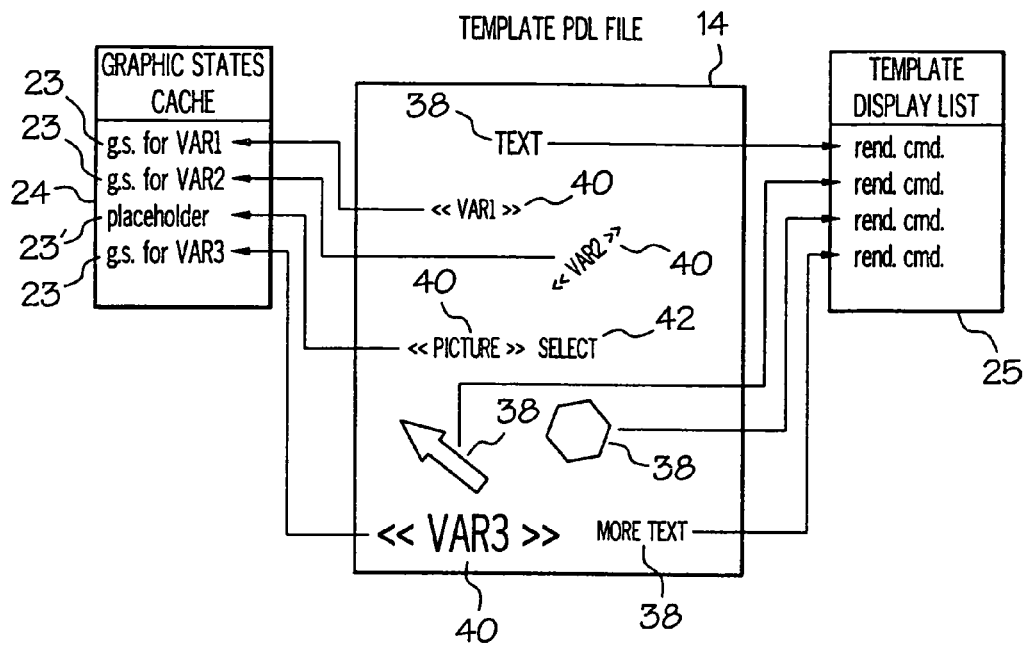
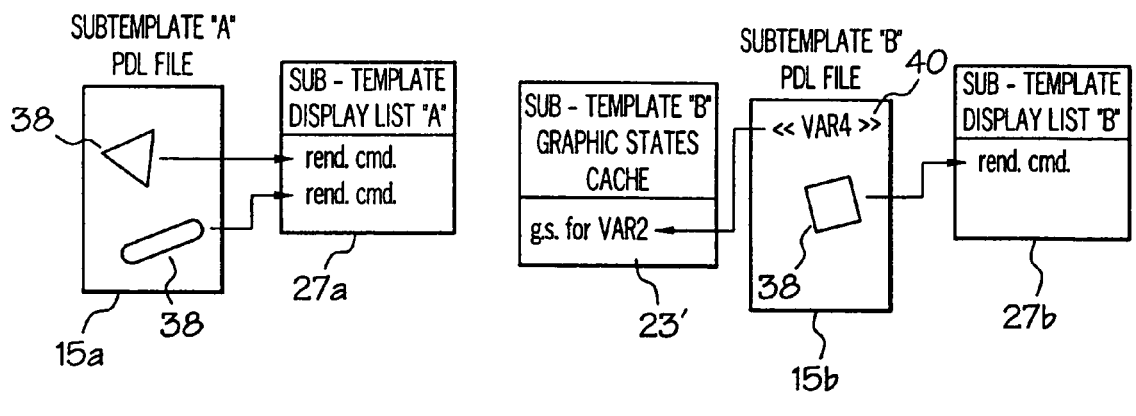
FIG. 2

[MergeFiles] ~74
    merge ~76

[merge] ~78
    FilePath        =       c:/class/mrgfiles/mydata04.mrg
    MergeType       =       delimited
    MergeHeader     =       yes
    RecordDelimiter =       "\r\n"
    FieldDelimiter  =       "\t"

[PageDescriptionLanguageFile] ~60
    letter_master ~62
    all_maps ~64

[letter_master] ~66
    FilePath        =       c:/class/psfiles/dirmail4.ps

[all_maps] ~68
70 — FilePath      =       c:/class/psfiles/maps4.ps
    SubTemplate    =       true
72 — Templates     =       South, East, West, Midwest

FIG. 4

| fname | lname | prefix | title | company | address | zip | region | city | state |
|---|---|---|---|---|---|---|---|---|---|
| Steven | Rodgers | Mr. | President | Rodger's Recreation | 698 Gimbel Way | 45429-0011 | Midwest | Kettering | OH |
| Susan | Chandler | Ms. | CEO | Chandler & Son | 777 Angel Street | 93003-8465 | West | Ventura | CA |
| Charles | Martin | Mr. | Manager | Chuck Incorporated | 731 Steeplechase Lane | 30136-2703 | South | Duluth | GA |
| Jerry | Cashel | Mr. | | Centerville Bel | 200 East Jrd | 45459-2558 | Midwest | Centerville | OH |
| Timothy | Wilson | Mr. | Account Mgr. | General Foam | 9012 Pepper Hill | 45040-8011 | Midwest | Mason | OH |
| Eleanor | Smith | Miss. | | Excellence Ink | 64 Lois Lane | 22192-9783 | East | Woodbridge | VA |
| Patricia | Thompson | Dr. | | Global Fabricator | 256 Nordegaz Dr. | 30226-2744 | South | Jonesboro | CA |
| Mark | Carrell | Mr. | | Campbell First Trust | 1104 Sunnyview Lane | 95008-7836 | West | Campbell | CA |
| Robert | Ludlow | Mr. | HR | Great Food Store | 407 Harrington Dr. | 45068-2454 | Midwest | Waynesville | OH |
| Lorna | Patterson | Dr. | President | Patterson Pet Care | 6441 Harrison Court | 66208-7831 | Midwest | Prairie Village | KS |
| Herman | Stevens | Mr. | | Herman Builder Supply | 4051 Colemere Circle | 26874-4902 | East | Germantown | MD |
| Doris | Vance | Ms. | President | Vance Valve Company | 7612 Castleton Place | 08731-3724 | East | Forked River | NJ |
| Janine | Store | Ms. | Vice President | JanCo Inc. | 3156 Glenmore Ave. | 67218-9557 | Midwest | Wichita | KS |
| Charlotte | Sellock | Ms. | | Hayward Auto Shop | 315 Garden Ave. | 94541-2829 | West | Hayward | CA |
| Kevin | Toner | Mr. | | Keller Fabrics Center | 503 Sunrise Ave. | 80027-1824 | West | Superior | CO |
| Teresa | Walton | Ms. | Senior Partner | Walton & Walton | 6839 TreeRidge Dr. | 22302-3101 | East | Alexandria | VA |
| Albert | Saunders | Mr. | Director | Incredible Toy Store | 3904 Oleander Court | 44309-1549 | Midwest | Akron | OH |
| Gregory | Hines | Mr. | President | King's Construction | 62 Nottingham Rd. | 86712-3834 | West | Tucson | AZ |
| Charles | Chapman | Mr. | Sales Mgr. | Washington Life | 811 Carlsik Rd. | 98020-9381 | West | Edwards | WA |
| Melinda | Mars | Mrs. | | Kramer's Kitten Care | 4867 Cherrywood Lane | 36695-1243 | South | Mobile | AL |
| Kathy | Henley | Ms. | | Memphis Pride | 958 Wilmington Pike | 38137-8245 | South | Memphis | TN |
| Robert | Prugerman | Mr. | Manager | Bob's Shell | 2749 Medford Street | 97204-2872 | West | Portland | OR |
| Patricia | Wall | Ms. | Manager | Holcomb's Florist | 2047 Garland Ave. | 50322-8245 | Midwest | Des Moines | IA |
| Thomas | Mantes | Mr. | | Victory House | 734 Broadway Street | 92076-1347 | West | Escondido | CA |
| Annette | Griffin | Ms. | Senior Partner | Deere & Griffin | 6900 Clifton Dr. | 97401-8245 | West | Eugene | OR |
| Jeffrey | Anderson | Mr. | Manager | Anderson's Pony Keg | 3673 Beaumont Ave. | 60093-3246 | Midwest | Northfield | IL |
| Madone | Davis | Ms. | President | Davis Company | 638 Kirkwood Drive | 85014-9356 | West | Phoenix | AZ |
| Francis | Knox | Mr. | | Ft. Knox Bank | 8732 Auburn Ave. | 95104-2488 | West | Cupertino | CA |
| Paul | Stockett | Mr. | | Clyde's Café | 629 Woodgreen Drive | 75080-5783 | South | Richardson | TX |
| Stacy | Morgan | Ms. | Sales Mgr. | Morgan Printing | 34 Riverside Drive | 98104-5683 | West | Seattle | WA |
| Donald | Gross | Mr. | | Gross & Stanton | 986 Patterson Blvd. | 94403-8346 | West | San Mateo | CA |
| Elizabeth | Braun | Mr. | Owner | Braun's Beauty Shop | 8267 Biger Road | 78534-9827 | Midwest | Lexington | KY |
| Daniel | Hegyel | Mr. | | Hounds & Company | 830 Clyo Ave. | 17774-4759 | South | Orlando | FL |
| Jane | Hurley | Ms. | Manager | Alabama Savings & Loan | 5270 Bahn Road | 36993-9348 | South | Wilmingham | AL |
| Grant | Bel | Mr. | President | Bel & Whistle | 267 Marshal Street | 24602-4591 | Midwest | Flint | MI |
| Bob | Shipp | Mr. | President | Shipp Worldwide | 2956 Stroop Ave. | 63453-7437 | South | Lake Charles | LA |
| Lori | Jackson | Ms. | | Jackson Jet Ski | 6248 Shroyer Blvd. | 06912-3927 | East | Trenton | NJ |
| Susan | Walters | Ms. | | Borden Bakery | 9218 David Road | 62435-4928 | West | Olympia | WA |
| Skip | Haroldson | Mr. | | Sports Arena | 6219 Dorothy Lane | 24583-9128 | East | Bridgeport | CT |
| Elaine | Johnson | Ms. | Manager | Demonte Grocery | 193 Springboro Pike | 26854-2345 | East | White Plains | NY |
| JoAnne | Stephenson | Mr. | | Madison Gazette | 9276 Alexandria Road | 72354-7437 | Midwest | Madison | WI |
| Bob | Checken | Mr. | | Gamca Extraordinaire | 1234 Danbury Road | 24578-0203 | East | Winchester | VA |
| David | Palmer | Mr. | | Oil & Lube | 7234 Carter Grove | 14578-7345 | Midwest | Paris | KY |
| Russel | Reynolds | Mr. | Distributor | Garden Center | 4268 Blanchester Lane | 28346-8912 | East | Anderson | SC |
| James | Williams | Mr. | | Wicker World | 5612 Hillendale Court | 56270-5238 | Midwest | Duluth | MN |
| AJ | Middlekamp | Mr. | | Rockford Quick Print | 2100 Walnut Creek Drive | 12038-5239 | Midwest | Rockford | IL |
| Eric | Greene | Mr. | | Rite Tire Centre | 4387 Mt. Meadows Court | 49772-8571 | Midwest | Richmond | OH |
| Dimitri | Jordan | Mr. | | Artineats of Omaha | 9234 Eastgate Drive | 28346-8134 | Midwest | Omaha | NE |
| Sarah | Youngtown | Ms | | Universal Temp | 29 Joseph Place | 50501-7637 | Midwest | Ft. Dodge | IA |
| Shannon | Jackson | Ms. | | Golf World | 98026 Burnister Street | 34293-9183 | South | Venice | FL |

FIG. 5

Thanks so much!

<<fname>> <<lname>>
<<company>>
<<address>>
<<city>>, <<state>> <<zip>>

Dear <<prefix>> <<lname>>:

Thank you for visiting Varis and your interest in VariScript. As a printer in the <<region>>, you are undoubtedly in search of new ways to reduce your total job development time. Recent marketing phenomena in printing requires more frequent changes in the layout than ever before. The result is the increased importance of keeping presentation (static layout) and data separate so those rapid changes can be accomplished.

Varis Corporation has a solution that will enable you to achieve these goals.

Is this new system compatible with my current pre-press equipment and format, and is it available in <<city>>?

These are probably your first questions. The answer to both is yes! The VariScript suite of products can be easily incorporated within your current pre-press equipment, and <<city>> is at the top of our list for our next product delivery!

Remember that a key advantage of VariScript is the ability to make last-minute changes in text, graphics, layout or data. Pre-flight information concerning your job's components is given to you via the Operator Display Terminal (ODT) before you place your printer on-line. This gives you better control over production schedules and ensures on-time customer deliveries.

With a minimal capital investment, VariScript offers you the opportunity to reduce your cost of operation, optimize the use of your staff and equipment, and provide additional services to your company.

Many of our customers are reporting astounding improvements in their production!

We look forward to talking with you about how the suite of VariScript products can help you achieve <<company>>'s goals.

<<region>> select

FIG. 6

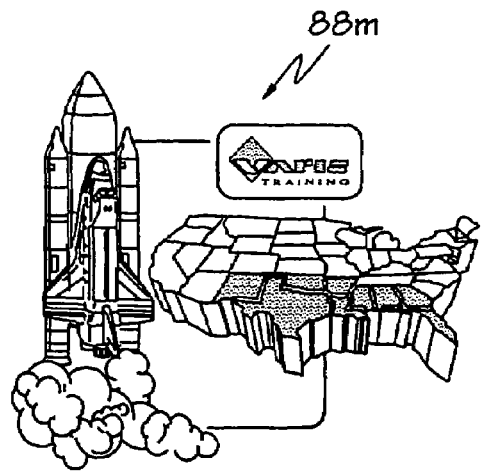

Thanks so much!

88a  88b

88c — Shannon Janszen
— Golf World
— 98626 Bannister Street
88h  88i  88d — Venice, FL 34293-9183

Dear Ms. Janszen:   88e  88f  88g   88j

Thank you for visiting Varis and your interest in VariScript. As a printer in the South, you are undoubtedly in search of new ways to reduce your total job development time. Recent marketing phenomena in printing requires more frequent changes in the layout than ever before. The result is the increased importance of keeping presentation (static layout) and data separate so those rapid changes can be accomplished.

Varis Corporation has a solution that will enable you to achieve these goals.   88k Is this new system compatible with my current pre-press equipment and format, and is it available in Venice?

These are probably your first questions. The answer to both is yes! The VariScript suite of products can be easily incorporated within your current pre-press equipment, and Venice is at the top of our list for our next product delivery!
88l Remember that a key advantage of VariScript is the ability to make last-minute changes in text, graphics, layout, or data. Pre-flight information concerning your job's components is given to you via the Operator Display Terminal (ODT) before you plave your printer on-line. This gives you better control over production schedules and ensures on-time customer deliveries.

88m

With a minimal capital investment, VariScript offers you the opportunity to reduce your cost of operation, optimize the use of your staff and equipment, and provide additional services to your company.

Many of our customers are reporting astounding improvements in their production!

We look forward to talking with you about how thw suite of VariScript products can help you achieve Golf World's goals.

METHOD AND SYSTEM FOR MERGING VARIABLE TEXT AND IMAGES INTO BITMAPS DEFINED BY A PAGE DESCRIPTION LANGUAGE

CROSS-REFERENCE TO RELATED APPLICATIONS

The present patent application is a Continuation of U.S. patent application Ser. No. 09/874,895, filed Jun. 5, 2001, now abandoned, which is a Continuation of U.S. patent application Ser. No. 09/291,121, filed Apr. 14, 1999 and issued as U.S. Pat. No. 6,243,172; which is a Continuation-In-Part of U.S. patent application Ser. No. 08/896,899, filed Jul. 18, 1997 and issued as U.S. Pat. No. 5,937,153; which is a Continuation-In-Part of U.S. patent application Ser. No. 08/373,582, filed Jan. 18, 1995 and issued as U.S. Pat. No. 5,729,665.

BACKGROUND OF THE INVENTION

The present invention relates to the high-speed printing industry, and more particularly, to a system and method for merging variable data and images into a template image defined by a page description language file in a high speed printing environment.

Application programs, such as wordprocessors, illustrators, and computer aided design systems are software packages used to create a document (text and graphics) on a computer screen and to simultaneously generate a page description language ("PDL") specification, which is to be transferred to the printer, or to any other type of raster device or output device for creating a hard copy or copies of the document. Alternatively a PDL specification can be generated by a programmer without the assistance of an application program.

The printer executes the PDL specification to generate a bitmap of the document, or a raster-data representation of a document, and eventually transfers the bitmap or raster-data to a physical medium such as paper. A typical PDL language, such as PostScript (a registered trademark of Adobe Corporation) defines a page of the document as containing a number of data areas, where each data area contains either graphic or alpha-numeric data. Each data area is defined by a "graphic state," which is a collection of parameters or attributes for controlling the representation and appearance of text and graphics. For example, the graphic state can include a set of text attributes such as scale factor, type font, etc. In postscript an example of a PDL command used to build a graphic state can be:

20 rotate/Times-Roman findfont 14 scalefont setfont

Examples of PDL commands used to define the graphic or alpha-numeric data that is displayed in the data area include:

0 0 moveto and (ABC) show

The entire group of PDL commands used to define a document is hereinafter referred to as the "PDL specification," Furthermore, the entire graphic state, or any particular attribute or combination of attributes included in a graphic state, or any similar attribute contained in a PDL specification for defining or controlling the representation, location and/or appearance of text and graphics in a final bitmap or raster image is hereinafter referred to as "graphic attributes."

In variable data printing each printed document shares a common template and there is at least one area in the template that changes for each printing of the template. Typical PDL languages are not designed for high-speed variable data printing because, with PDL languages and interpreters, even if a single item of data in the document changes, an entirely new PDL specification must be created and interpreted. For example, if 100,000 copies of a mass mailing advertisement were to be printed (i.e., each copy of which is identical except for the mailing address) it is typically necessary to generate a new PDL specification for each copy to be printed. Hence, to generate 100,000 advertisements, it would be necessary to generate 100,000 PDL specifications, even though each advertisement is virtually the same except for the variable data area. The processing time required to interpret and render 100,000 PDL specifications is enormous, significantly slowing the entire printing system.

Furthermore, typical PDL languages do not include the capability of rapidly merging variable images or bitmaps (such as company logos, coupons, charts, and the like) along with variable text data into the template bitmaps. Accordingly, there is a need for a high-speed printing operation having the ability to merge variable data (which includes variable text data and bitmap images) into a template defined by a PDL specification.

SUMMARY OF THE INVENTION

It is an object of the present invention to provide as system and method for merging variable text and bitmap images into a PDL specification in high-speed printing operation. It is a further object of the present invention to provide the ability to generate a plurality of merged bitmaps, which are each essentially a copy of the template, except for at least one portion of the template into which the variable data has been merged. In this portion, each merged bitmap can contain a different set of variable data merged into it. The template is defined by a PDL specification, and this template specification only needs to be processed or interpreted once before creating all of the merged bitmaps, thus providing an extremely high-speed variable data printing operation. The variable images to be merged into the template may also be defined by "sub-template" PDL specifications, which also need only be processed or interpreted once. Such sub-template specifications may also allow for variable data or images to be merged into them as well, before being merged into the primary template.

A computer implemented method for merging variable data into an image defined by page description language specification ("PDL specification"), according to the present invention, generally comprises the steps of: processing (interpreting) the template PDL specification to produce a template; processing the sub-template specification (defining the variable bitmap image) to produce a sub-template; identifying a variable data identifier in the template specification; associating the sub-template with the variable data identifier; and merging the sub-template into a copy of a template to generate a merged bitmap.

More specifically, a computer implemented method of the present invention comprises the steps of: a) generating a template PDL specification, the template specification including template data and associated graphic attributes (i.e., graphic states) defining how the template data is to appear on a printed page, the template specification including at least one variable data identifier; b) generating a plurality of sub-template PDL specifications, each sub-template specification including sub-template data and associated graphic attributes defining how the sub-template data is to appear on a portion of a printed page; c) interpreting the template specification so as to generate a template bitmap or a plurality of template rendering commands (display list), and during the interpreting step, identifying the variable data identifier; d) saving the template bitmap or the plurality of template rendering commands into memory; e) associating the variable data identifier with the sub-template specifications; f) accessing a first sub-template specification from the plurality of sub-template specifications; g) processing the first sub-template specification so as to generate a sub-template bitmap or a plurality of first sub-template rendering commands; h) accessing a copy of the template bitmap or the plurality of template rendering commands from memory; i) merging the copy of the template bitmap or template rendering commands with the sub-template bitmap or sub-template rendering commands so as to provide a first merged bitmap or first merged plurality of rendering commands; j) generating a first merged bitmap from the first merged plurality rendering commands (if necessary); k) accessing a next sub-template specification from the plurality of sub-template specifications; l) processing the next sub-template specification so as to generate a next sub-template bitmap or plurality of next sub-template rendering commands, m) accessing a copy of the template bitmap or template rendering commands from memory; n) merging the copy of the template bitmap or template rendering commands with the next sub-template bitmap or sub-template rendering commands so as to provide a next merged bitmap or next plurality of rendering commands; and o) generating a next merge bitmap from the next merged plurality of rendering commands, if necessary. The steps k-o may be repeated, as necessary, to generate a plurality of merged bitmaps.

The method of the present invention is accomplished by executing a control task in conjunction with a PDL interpreter program. The control task generates a template display list based upon the PDL commands in the PDL specification. The display list includes a plurality of rendering commands, where each rendering command designates a particular data area or object to be rendered, the graphic states to be applied to the data area and the offset address at which the rendered object, if any, in the data area is to be over written onto the final bitmap. The graphic states for each data area re set forth in the PDL specification, and pertain to the print attributes that describe how particular graphic or alpha-numeric data is to appear on the printed page. These attributes can include size, font, position, orientation, location and the like. The control task also generates display lists for each of the sub-template PDL specifications.

The control task, during the PDL interpretation procedures, monitors the data areas defined by the PDL specifications to watch for variable data identifiers defined by the PDL code. If the control task identifies a data area or object as being (or including) a variable data identifier, it reserves the graphic states associated with that variable data identifier in a cache and continues on with the interpretation procedure, preferably without adding the rendering commands for that variable data area into the display list. In this identification step, the control task will also watch for attributes associated with the variable data identifier. Such attributes may define the variable data identifier as identifying a sub-template bitmap, which is to be merged into the bitmap represented by the PDL specification. If the interpreter detects such an attribute, rather than saving off the graphic states associated with this variable data area, the control task will instead store a "place holder" in the graphic states cache corresponding to the sub-template PDL specification identified in the variable data identifier string. In certain embodiments of the invention, the control task may include certain graphic attributes associated with the variable data identifier in the cache, along with the place holder, such as a graphic attribute defining the location of the variable data identifier (which may be used to determine where to merge the sub-template bitmap into the template bitmap).

Once the interpreter program completes its interpretation of the PDL specifications, the control task saves each display list in memory without dispatching a bitmap of the template or sub-template to the printer. Subsequently, the merge task is initiated which accesses a copy of the template display list from memory and begins processing the rendering commands in the display list to create a bitmap of the template. Also, the merge task accesses a variable data record from a merge file; associates the variable data record to the graphic states in the cache and creates bitmaps for the data in the variable data record by applying the reserved graphics states to the data in the variable data record these bitmaps may be merged into the template bitmap or rendered directly onto the template bitmap during, before, or after the rendering of the template bitmap. When the merge task reaches the place holder in the cache associated with the sub-template display list, the merge task will access and begin processing the rendering commands in the sub-template display list to create a bitmap of the sub-template, which is then merged onto the template bitmap. When finished with the rendering commands of the sub-template display list, the merge task will return to the processing of the variable data record by applying the reserved graphic states thereto and merging the resulting bitmaps into the template bitmap. The merge task is repeated for each variable data record in the merge file to create a plurality of the merged bitmaps.

Therefore, the PDL specifications of the template and sub-templates need only be interpreted once, saving significant processing time for the variable printing operation, because the reserved graphic states may be utilized over and over again to create the variable bitmaps for each variable data record contained in the merge file. Similarly the display lists of the templates and sub-templates may be used over and over again to create the multiple merged bitmaps.

In its simplest form a sub-template is a collection of graphic states or graphic attributes taken from another source (such as a PDL specification) and used collectively as a variable element inserted into a template PDL page. The sub-templates may be used to add variable graphics/logos, or other static images to a page; to add formatted pieces (such as graphs, charts, images, etc.), including any number of additional variable fields to a page, a page of variable coupons directly marketed to the end receiver, and the like. The sub-template is really just another PDL page used as an element drawn somewhere on another page. For example, one coulde have a PDL page that had a company logo drawn on it. One could then use that logo on demand whenever a printed page calls for it. Taken further, one could have several different logos, each drawn as a separate PDL page, which one could add (or not) to any page printed during the processing job.

BRIEF DESCRIPTION OF THE DRAWINGS

FIG. 2 is a schematic flow diagram illustrating the method of the control task according to the present invention;

FIG. 4 is an example of a job ticket file for use with the present invention;

FIG. 5 is an example of a merge file for use with the present invention;

FIG. 6 is an example of a sub-template file for use with the present invention.

FIG. 8 is an example of a merged page created by the process of the present invention using the PDL specification of FIG. 7, the job ticket of FIG. 4, the sub-template specifications of FIG. 6 and the merge file of FIG. 5.

DETAILED DESCRIPTION

Figure 1:
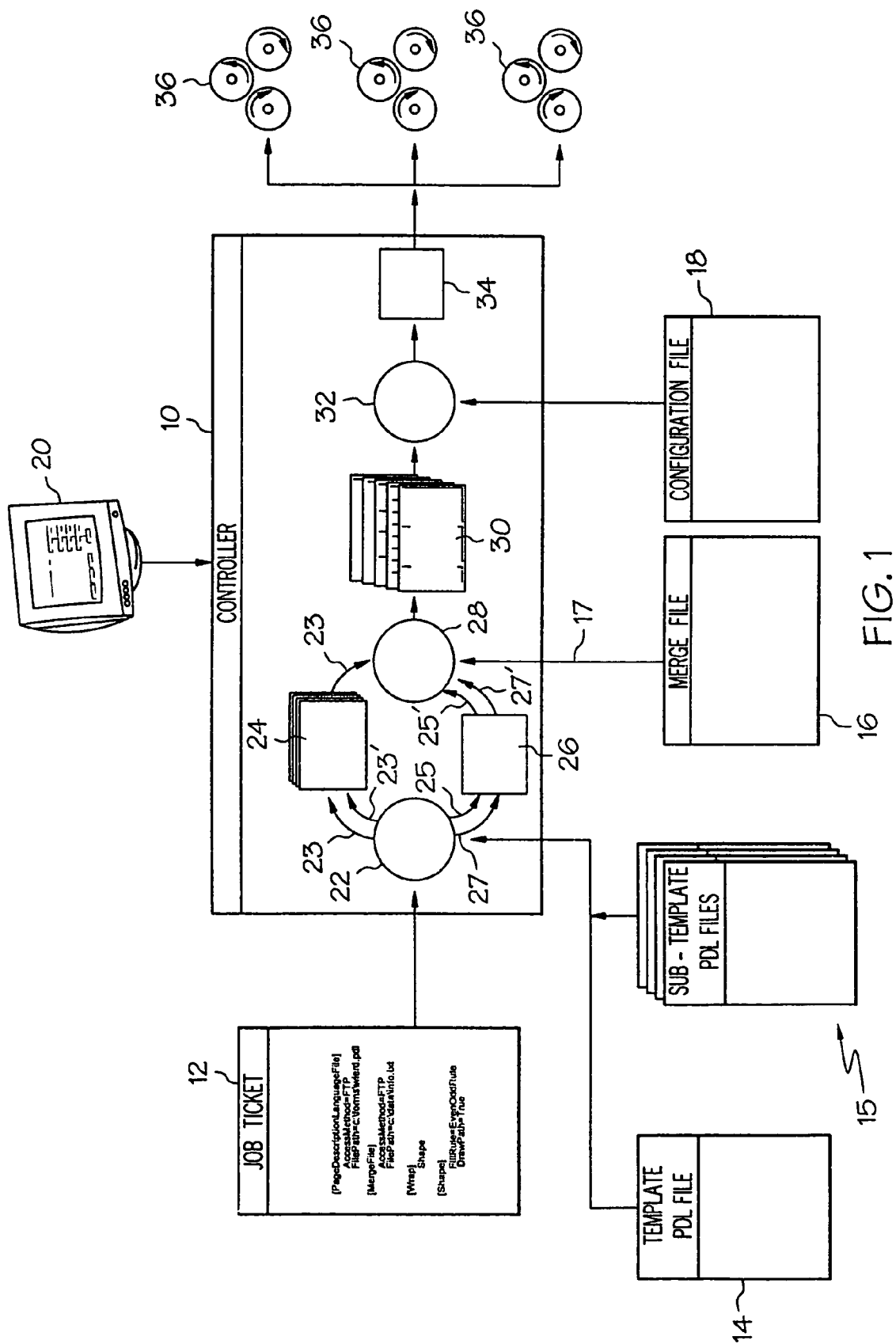
FIG. 1 is a schematic, block diagram representation of a high-speed printing system according to the present invention.

As shown in FIG. 1, a system for performing the method of the present invention includes a printer controller 10 having access to a job ticket file 12 a page description language ("PDL") file of a template 14, a plurality of PDL files for sub-templates 15, a source of variable data such as a merge file 16 and an optional printer configuration file 18. The system also contains an operator control terminal 20 for providing operator controls such as indicating the name and path of the job ticket file 12 for the specific print job.

The job ticket file 12 contains the guidelines for the print job which can include the names and locations of the PDL files 14, 15, the merge files 16, the configuration files 18, etc.; and may also include special instructions pertaining to the print job such as identifying and locating sub-templates, defining additional graphical attributes for variable data areas identified during the process, and the like, all of which is described in greater detail below. The PDL files 14, 15 are preferably PostScript® specifications created by an application program such as a wordprocessor, illustrator, or computer aided design system. The merge file 16 contains platform independent data, such as text data, image data, bar-code data and the like, which is to merged into a template bitmap defined by the PDL template specification 14 or the PDL sub-template specifications 15 during the merging task, as will be described in detail below. The configuration file 18, defines the print engines and the post processing equipment and other options to be executed.

Initially, the path and name of the job ticket file 12 is specified by the operator using the operator control terminal 20. The printer controller 10 retrieves the job ticket file 12 and then retrieves the PDL files 14, 15 specified in the job ticket file. Next, the controller 10 initiates a control task 22 in conjunction with a page description language interpreter program.

The control task 22 interprets the PDL specifications from the PDL files 14, 15 and monitors data areas defined in the PDL specifications to watch areas defined by the specifications to become variable. If the control task identifies a data area as being a variable data area, it reserves the graphic states and/or other associated graphic attributes 23 of that variable data area in a cache or memory 24 and then moves on to the next data area defined by the particular PDL specification, usually without allowing any data defined by the variable data area to be added to the template bitmap. The control task also looks for predetermined attributes defined in the data areas to determine if the data area is defining the importation of a sub-template bitmap. If the control task detects such an attribute, rather than storing the graphic states associated with the data area in the cache 24, it stores a placeholder 23' in memory, which will instruct the merge task that a sub-template is to be incorporated into the present template or sub-template bitmap during the merge task 28, and will also include information identifying the one or a group of the sub-templates that may be merged into the present template or sub-template bitmap. Once the control task completes its processing of the particular PDL specification, the control task saves the template display list 25 or sub-template display list 27 in memory 26. The template and sub-template display lists 25, 27 will include a plurality of rendering commands for the static data defined in their respective PDL specifications. Each rendering command designates a particular static data area or object to be rendered, the graphic states and/or graphic attributes to be applied to the static data area and the offset address at which the rendered object, if any, in the static data area is to be over written onto the final bitmap.

Next, a merge task 28, having access to the variable data records 17 from the merge file 16 is executed to apply the reserved graphic states and/or graphic attributes 23 to the variable data records 17, creating rendering commands for that variable data record as defined by the graphic states. The merge task 28 retrieves a copy 25' of the template display list from the memory 26 and merges the variable data rendering commands with the template display list to create a merged display list 30. The merge task will also look for place holders 23' among the graphic states stored in the memory 24 during this merging operation. If a place holder 23' is detected, the merge task will access a copy 27' of the display list of the sub-template corresponding to the place holder and will then merge the rendering commands from the display list of the sub-template 27' with the merged display list 30. It is noted that the sub-template may also include an associated cache of graphic states and/or graphic attributes corresponding to variable data areas (or even additional levels of sub-templates) defined within the sub-template. Therefore, if such a cache is present with a particular sub-template, the merge task will apply such stored graphic states and/or graphic attributes to the present variable data fields in the variable data record 17 linked to the graphic states to therefore create rendering commands for such variable data fields. These rendering commands are also merged into the display list 30.

Once the merged display list 30 is created, the controller 10 performs a rendering task 32 to render the merged display list 30 into a plurality of bitmap bands 34 for dispatching to at least one print engine 36. A general method for performing the above control task is described in U.S. Pat. No. 5,729,665, the disclosure which is incorporated herein by reference. A method and system architecture for performing the above merging, banding and dispatching operations are respectively described in U.S. Pat. Nos. 5,594,860 and 5,796,930, the disclosures of which are also incorporated herein by reference.

As shown in FIG. 2, a graphical flow diagram representation of the control task is illustrated. As discussed above, the primary function of the control task is to monitor a PDL interpreter program which interprets the PDL specifications for the template (14) and the sub-templates 15 to create display lists 25, 27, containing the rendering commands for the static data in the PDL specifications, and a cache of graphic states and/or graphic attributes corresponding to the variable data areas identified by the PDL specifications. While the PDL specifications are typically in the form of a list of PDL commands (as described above) the specifications 14, 15a and 15b shown in FIG. 2 are shown, for clarity, as they would have appeared to the artist using the application program (such as QuarkXPress®) to create such PDL specifications.

As shown in FIG. 2 the template PDL file 14 includes a plurality of static data areas 38 and a plurality of variable data areas 40. The variable data areas are identified by the control task as a text string surrounded by special characters, "<<" and ">>". The phrase or word within the special characters corresponds to the field name for the particular variable data area. These strings may also be followed by an attribute command string 42, which may define special attributes to be applied to the particular variable data area. With respect to the template PDL file shown in FIG. 2, the variable data identifier with the field name "PICTURE" is followed by the attribute command string "SELECT", which, as will be discussed below, informs the control task that the particular variable data area corresponds to the insertion of a sub-template.

As discussed above, the rendering commands for the static data areas 38 in the template PDL file are stored in a template display list 25 and the graphic states 23 of the variable data areas 40 are stored in a cache 24. As also discussed above, and as will be discussed in detail below, the graphic state stored in the cache for the variable data area having the "select" attribute string is merely a place holder 23', which will instruct the merge file to insert a sub-template bit map into the template bit map being rendered.

The control task will also interpret the sub-template PDL files 15a, 15b, shown as sub-template "A" and sub-template "B" in FIG. 2. Sub-template "A" 15a includes two static data areas 38, and therefore a sub-template display list 27a is created for the sub-template "A" PDL file, including the rendering commands for such static data areas. The sub-template "B" PDL file 15b includes a static data area 38 and a variable data area 40. Therefore, the control task will create a sub-template display list 27b, including the rendering command for the static data area and will cache the graphic states 23' for the variable data area. It is noted here that the variable data identifiers in the sub-template PDL specifications may also include attribute strings for special processing, such as specifying additional levels of sub-template files. For the purposes of simplicity, the present example is shown with only one level of sub-templates.

Figure 3:
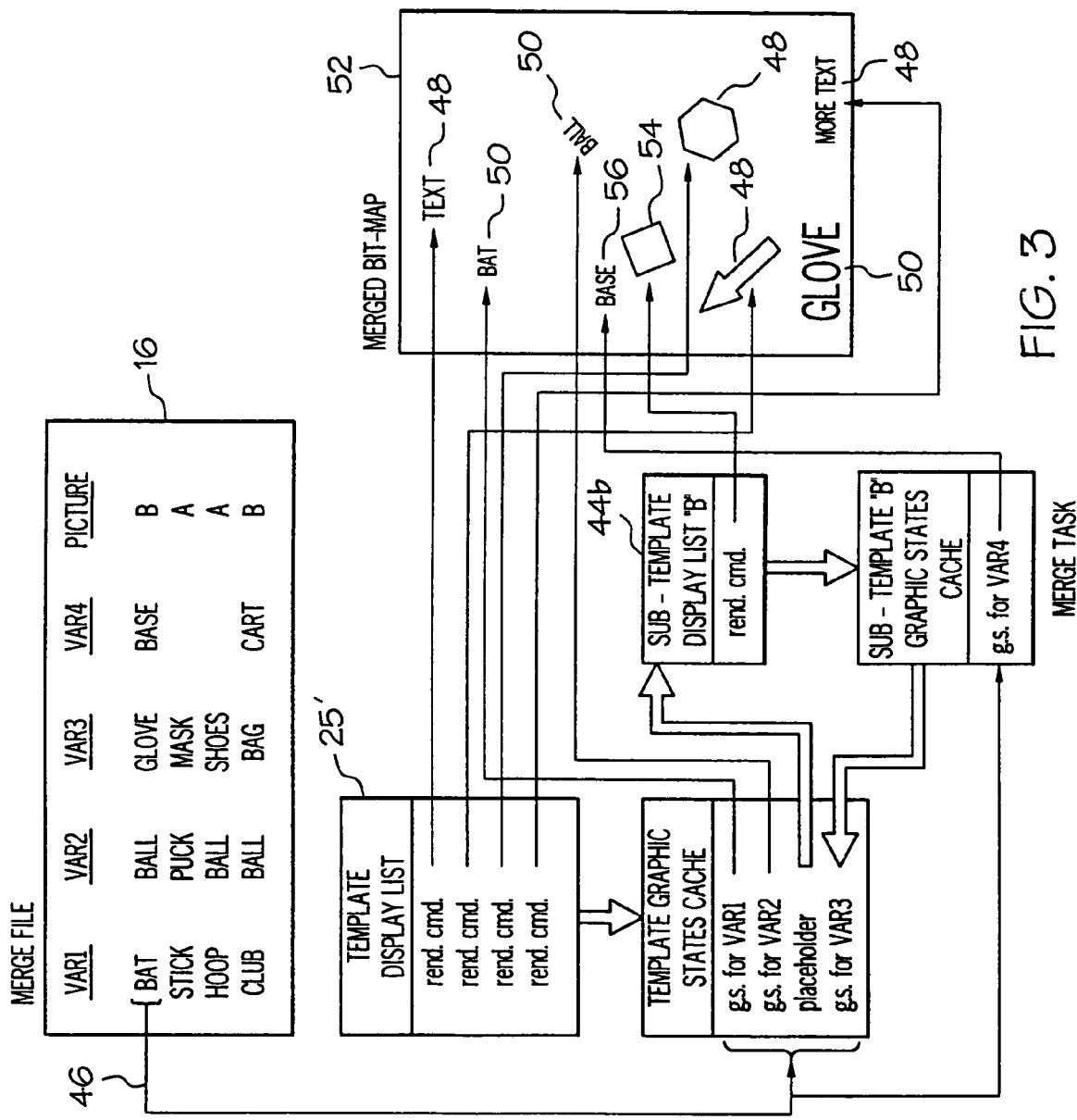
FIG. 3 is a schematic flow diagram representing the method of the merge task according to the present invention.

As shown in FIG. 3, the merge task will access a copy 25' of the template display list and will also access a first record 46 from the merge file 16. Note that the first record has record fields, in the form of text strings, for each of the field names VAR1, VAR2, VAR3 and VAR4. For the field name PICTURE, the record includes a name (in this example either A or B) corresponding to the sub-template to be inserted for the variable data identifier 40 having the field name "PICTURE." The merge task accesses the rendering commands from the copy of the template display list 25' to add to a merged display list 30. Such rendering commands will be processed by the rendering task 32 to generate the bit maps 48 for the static data areas from the template PDL specification 14 to appear in the merged bitmap 52. The merge task will link the cached graphic states 23 to the to the record fields by matching the field names associated with the cached graphic state to the field names in the merge file. For example, the cached graphic states for the variable data identifier 40 having the field name "VAR1" will be linked to the record fields in the merge file under the field name "VAR1." Once linked, the merge task will apply the graphic states 23 to the data in the associated record field to create rendering commands for such data, which are to merged into the merged display list 30. Such rendering commands will be processed by the rendering task 32 to generate the bit maps 50 in the merged bitmap 52. This is done for each of the graphic states in the cache.

When the merge task reaches the place holder 23' in the template graphic states cache, it will link the place holder 23' to the to the record fields by matching the field name associated with the the place holder 23' to a field name in the merge file. For example, the he place holder 23' for the variable data identifier 40 having the field name "PICTURE" will be linked to the record fields in the merge file under the field name "PICTURE." The field name in the record will identify which of the sub-templates to merge into the merged display list 30 and eventually into the merged bitmap 52. Because the merge record 46 indicates that the sub-template "B" is to be used, the merge task accesses the sub-template display list 44b and merges its rendering commands into the merged display list 30. Such rendering commands will be processed by the rendering task 32 to generate the bit maps 54 in the merged bitmap 52. The merge task also accesses the associated cache of graphic states for the sub-template, and applies the graphic states to the record fields linked to the graphic states so as to generate rendering commands for the data of the record fields that are to be merged into the merged display list 30. Such rendering commands will be processed by the rendering task 32 to generate the bit maps 56 in the merged bitmap 52.

Note that if this sub-template "B" included a further level of sub-templates, the cache graphic states for the sub-template would also include a place holder, and the merge task would access the sub-templates associated with this place holder for another level of sub-template processing.

The final merged big map 52 includes the static data bitmaps 48 defined by the template PDL file 14, the static data bitmaps 54 defined by the sub-template "B" PDL file 15b, the variable data bitmaps 50 having the graphic attributes corresponding to the cached graphic states for the variable data identifiers 40 in the template PDL file 50, and the variable data bitmaps 56 having the graphic attributes corresponding to the cached graphic states for the variable data identifiers 40 in the sub-template "B" PDL file 15b. The location of the bit maps 54, 56 from the sub-template "B" PDL specification can be defined by the job ticket file (see the Appendix to this disclosure). Furthermore, it is within the scope of the invention to include a graphic state or graphic attribute with the place holder that corresponds to the location of the variable data identifier (this graphic attribute may also include other information such as orientation, size, etc.). This additional graphic attribute may be stored with the place holder and applied to the bit map data from the sub-template file during the merging operation. For example, a graphic state corresponding to the location of the variable data identifier having the attribute 42 corresponding to the sub-template may be stored with the place holder in the graphic state cache to direct the merge task to place the bit maps from the sub-template in the merge bit map 52 in the location directed by the stored graphic state.

An embodiment of the present invention is illustrated by way of example in FIGS. 4-8. As illustrated in FIG. 4, the job ticket file 12 contains a group header 60 "[PageDescriptionLanguageFile]" indicating that the phrases below that group header 60 are the names of page description language files to be processed by the control task. In the present example, there are two page description language files: a file "letter_master" 62 and a file "all_maps" 64. The job ticket file 12 includes a group header 66 "[letter_master]," under which are defined the location and attributes for that PDL file. Note that with this PDL file no attributes are defined and only the path location for the file is indicated. Another group header 68 "[all_maps]" defines the path and attributes for the all_maps PDL file. Note that an attribute string 70 "SubTemplate=true" indicates that this file is a sub-template file and the attribute string 72 "Templates=South, East, West, Midwest" indicates that the file includes four sub-templates, named South, East, West and Midwest.

The job ticket also includes a group header 74 "[MergeFiles]" identifying the names of the merge files to be used in the merge task. In the present case a single merge file 76 is named "merge." Below that, a group header 78 "[merge]" is given, under which the attributes and location of the merge file is set forth. The attribute strings for this merge file indicate that the merge file is delimited and includes merge headers. The attribute strings also indicate that the records are delimited by a carriage-return/line-feed character and the particular fields in each record are delimited by a tab character. A complete description of the different attributes that can be defined for the PDL files is described in detail in the Appendix below.

As illustrated in FIG. 5, the merge file 16 has a platform-independent data file that contains the "variable" data to be merged into the path defined in the PDL specification, and also includes names associated with the sub-templates to be merged into the PDL specification during the merge task. The merge file in the present example includes a plurality of rows of merge records separated by carriage-return/line space characters, where each record includes the following fields: "fname," "lname," "prefix," "title," "company," "address," "zip," "region," "city" and "state." As will be described below, the data in the field "region" doubles as variable data and also as a name of a sub-template to be merged into the final bit maps.

As illustrated in FIG. 6, the designer will utilize an application program to create a document containing static data and variable data identifiers. The application program will then be directed to create a PDL specification of the document by the designer. The variable data identifiers 80 each include a field name surrounded by special characters, "<<" and ">>", and may also include an attribute string 82 following the field name and special characters. The attribute string will be described below. The PDL specification generated by the application program will include the graphic states of the variable data identifiers 80. These graphic states can include the font size (i.e., 12 point), the type-font (i.e., Helvetica), the orientation (i.e., horizontal), the location such as x and y coordinates, and the like. As discussed above, the control task will create a display list with the rendering commands for the static data in the PDL specification and will cache the graphic states for the variable data identifiers without transferring the rendering commands for the variable data identifiers to the display list. The variable data identifier in the bottom center portion of the page includes the "select" attribute, indicating to the control task that a sub-template bit map is to be inserted into the document. The field name "region" associated with this variable data identifier indicates that the sub-template name will be under the heading "region" in the merge file.

Referring to FIG. 5, the regions named in the merge file are South, East, West and Midwest. Therefore, referring to FIG. 4, the sub-templates having the name South, East, West and Midwest are found in the PDL file defined under the "all_maps" group header (68) in the job ticket. Note that the attributes defined under the "all_maps" group header do not include an attribute directing the location of the sub-template. Therefore, the lower left-hand corner of the sub-template merged into the final document will be directed by the locational graphic states of the variable data identifier stored along with the place holder in the graphic state cache.

Figure 7:
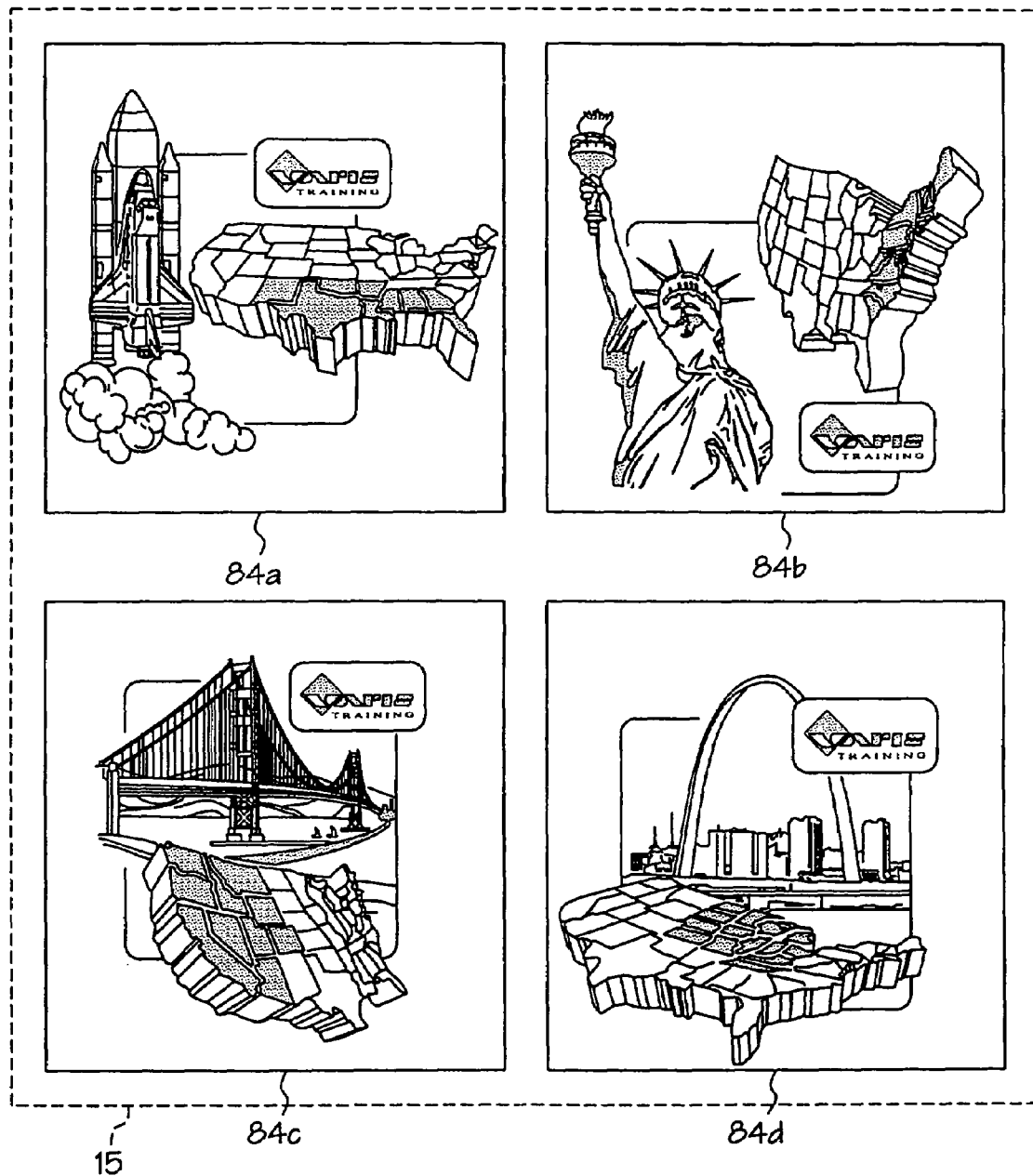
FIG. 7 is an example of a template file for use with the present invention.

FIG. 7 illustrates the sub-template PDL file 15, including the four sub-templates: South 84*a*, East 84*b*, West 84*c* and Midwest 84*d*. The merge task will access a variable data record 86 from the merge file 16 and a copy of the display list for the template PDL file 25. As discussed above, the merge task will generate rendering commands for the variable data records in the merge file by applying the cached graphic states linked to the variable data records. These rendering commands will be merged into the merged display list along with the rendering commands from the display list for the template PDL file. The merge task will also merge the rendering commands from the display list of the sub-template named by the variable data records into the merged display list. The rendering task will process the rendering commands in the merged display list to generate the final merged bit map for the present variable data record 86. This bit map appears in FIG. 8.

Referring to FIGS. 5, 6 and 8, the merge task will apply the cached graphic states linked to the variable data fields in the variable data record 86 as follows. The first graphic state in the cache will be for the first variable data identifier 80*a*. The field name for this variable data identifier 80*a* is "fname," which in the particular variable data record, corresponds to "Shannon." Therefore, the final merged bit map will include a bit map of the text, "Shannon" 88*a*, having the graphic states for the variable data identifier 80*a*. Likewise, the second cached graphic state will be for the variable data identifier 80*b* which includes a field name "lname," corresponding to the term "Janzen" in the particular variable data record 86. Therefore, the final merged bit map will include a bit map of the text, "Janzen" 88*b*, having the graphic states for the variable data identifier 80*b*. Correspondingly, the remaining graphic states, except for those of variable data identifier 88*m*, which is the variable data identifier including the sub-template attribute 82, will be processed in the same way resulting in bit maps 88*c*-88*n* in the merged bitmap.

When the merge task reaches the place holder in the graphic state cache associated with the variable data identifier 80*m*, it will refer to the merge record for the name of the sub-template under the field name "Region," which in the present example is "South." Referring to FIG. 7, the sub-template having the name "South" is sub-template 84*a*. Accordingly, the merge file will then merge the rendering commands from the display list of the sub-template 84*a* into the merged display list. Some or all of these rendering commands will also be modified by a graphic attribute corresponding to the location that the sub-template is to be merged into the merged bit map. As discussed above, this graphic attribute may be taken from the graphic state of the variable data identifier 80*m* or may be defined in the job ticket file.

The present invention also provides for the flowing of sub-templates into a path defined by the template specification. Such a feature is based upon the invention disclosed in U.S. patent application Ser. No. 08/897,467, filed Jul. 18, 1997. Specifically, the feature includes the steps of: associating a path defined by the template PDL specification with the variable data identifier with the "sub-template" attribute string; and merging the sub-template(s) into the path according to the path boundary and according to a predefined flow rule (as will be defined in the job ticket). The path may be associated with the attribute string, for example, by having the PDL command for the path immediately follow the PDL command for the attribute string in the PDL specification, or by having the PDL command for the path "grouped" with the PDL command for the attribute string using a GROUP command provided by the application program.

The following Appendix provides a preferred compilation of commands and parameter definitions that can be specified in the job ticket file 12 for the sub-template application as described above. Each entry provides a particular command header, the syntax for the command, any relevant remarks for the use of the command, examples, etc. As will be appreciated by one of ordinary skill in the art, the present invention includes any and all additional functions, features and attributes detailed in the Appendix.

Appendix

[PageDescriptionLanguageFile]

A group that provides a list of tags which you create to describe the PDL file(s) to be used in the print job. Each tag will become a user-defined group to give additional information about a specific PDL file.

Syntax [PageDescriptionLanguageFile]
  PDL File Tag A
  PDL File Tag B

Remarks Required
  The number of tags listed equals the number of PDL files that VariScript is to interpret during the job. Every tag that appears under this initial [PageDescriptionLanguageFile] group will become a new group name in succeeding sections of the Job Ticket.

Explanation
  PDL File Tag A
    Create a descriptive name for the first PDL file used in the print job. This tag is for use within the Job Ticket only and is not used outside of that context.
  PDL File Tag B
    Create a descriptive name for the next PDL file used in the print job. This tag is for use within the Job Ticket only and is not used outside of that context.

Example [PageDescriptionLanguageFile]
  Cover Form
  Contents Form
  Letter Form
  A user-defined tag name for a group that provides information about a PDL file and corresponds to a descriptive tag that you created under the initial [PageDescriptionLanguageFile] group.

Syntax [PDL File Tag]
  File Path=
  <other host access parameters>
  <VariScript rendering parameters>
  Templates=
  Sub Template=
  Sub Template Area=

See Also Templates

Remarks A separate [PDL File Tag] group is required for each descriptive tag listed under the initial [PageDescriptionLanguageFile] group.
  Case sensitivity of the values that you define depends on the host operating system.

Explanation [PDL File Tag]
  Take the descriptive tag under the initial [PageDescriptionLanguageFile] group and write it here as a group name within brackets [].
  File Path=
  Write the drive, path, and file name for the PDL file being described. The format of your notation is dependent on your host computer. See the FilePath element description in Chapter 3.
  <other host access parameters>
  Define values for any other host access parameter for which the default value is not accurate for access to this PDL file. See the element descriptions in Chapter 3.
  <VariScript rendering parameters>
  Define a value for any VariScript rendering parameter which will be applied to all of the templates in this specific PDL file. These elements include PSAnchor, PSLength, PSN Planes, PSOrientation, PSResX, PSResY, PSRotation, PSScale, PSScaleX, PSScaleY, PSTranslateX, PSTranslate Y, and PSWidth. See. the element descriptions in Chapter 4.
  Applying a VariScript rendering parameter here will override the definition of the same parameter in the configuration file and in the [JobSetup] group This definition, in turn, can be overridden by the definition of the same parameter in the [Template Tag] group.
  Templates=
  See the Templates element description.
  SubTemplate=
  See the Sub Template element description.
  SubTemplate Area =
  See the Sub Template Area element description.

Example [Cover Form]
  File pate=forms/cover.ps
  Templates=tempA, tempB, tempC, tempD Templates
  An element that provides a list of descriptive tags which you create to represent the names of the templates in a PDL file.

Syntax Templates=Template Tag A, Template Tag B, Template Tag Z

Remarks Templates is an element within the user-defined [PDL File Tag] group.
  NOTE: Each descriptive template tag that you create is for use within the Job Ticket only and is not used outside of that context.
  The template tags must be unique within the print job and must appear in the order in which the templates are defined in the PDL file(s). A template that requires no further definition can be represented by a blank tag.
  Each tag that appears as a parameter of Templates may become a user-defined group name listed elsewhere in the Job Ticket. The Templates statement simply lets VariScript know that it is to look for user-defined groups and then provides the names (tags) of these groups.
  Therefore, in theory, a PDL file with ten pages could have up to ten template tags listed within the Templates element. If any templates need not be named, the order of templates can be preserved by inserting blank template tags into the list.

Explanation
  Template Tag A
    Create a descriptive name for the first template in this PDL file. This tag is for use within the Job Ticket.
  Template Tag B
    Create a descriptive name for the next template in this PDL file. This tag is for use within the Job Ticket.
  And so on.

Example Templates=tempA, tempB, ,tempD

Subtemplate
  An element that identifies the templates within the specified PDL file as being subtemplates.

Syntax SubTemplate={True|False}

Remarks Optional.
  A subtemplate is a template or PDL page that is used as an object to be inserted on another page.
  A default value for SubTemplate is False.

Explanation {True|False}
  If all (or most) of the templates within the specified PDL file are to be identified as subtemplates, type True.
  If all (or most) of the templates within the specified PDL file are NOT subtemplates, type False.

Example SubTemplate=True

Subtemplate Area
  An element that assigns a subtemplate name and describes the portion of a template to be used as a subtemplate.

Syntax SubTemplate Area=Name"<SubName>"X<Units><Unit Type>\
  Y<Units×Unit Type>Width<Units><Unit Type>\
  Height<Unit><Unit Type>

See Also SubTemplate

Remarks Optional if SubTemplate=True. Ignored if SubTemplate=False.

This element may be used to specify what part of a template should be used as a subtemplate and to give that extracted portion a subtemplate name.

When this element is defined at a PDL file level, the system will recognize the same extracted portion of each template in the file as being a subtemplate.

Explanation Name "<SubName>"

This value assigns a specific name to the subtemplate.

Type the word Name followed by a space. For "<SubName>", type the name to be assigned to this subtemplate. Enclose the subtemplate name in double quotation marks (" ")

NOTE: A subtemplate will be known by the official name of the template, unless it is given another name through the SubTemplate Area element.

The official template name is defined by the method of highest precedence. The template name of lowest precedence is the default system-generated template name, followed by the template name you physically define on the PDL template. Of highest precedence is the template name defined using the NewName element in the [Template Tag] group.

Example: Name "mysub1"

X<Unit><Unit Type>

This value identifies the subtemplate's offset, the horizontal distance between the left side of the template and the area to be extracted.

Type the character X followed by a space. For <Units>, type the horizontal distance from the template's left side to the beginning of the area to be extracted.

An X value of 0 represents a location flush along the left side of the template. Increasing the value of X locates the area to be extracted the defined distance to the right.

This value is expressed in unitized format if the unit type is different from the default unit type defined in the Units element. Possible <Unit Type> values are:

cm for centimeters
dm for decimeters
dots for dots
ft for feet
in for inch (default value)
m for meters
mils for mils
mm for millimeter
nm for nanometers
pixels for pixels
pts for points
pulses for pulses
yds for yards The default value for X is O.

Y <Units ><Unit Type>

This value identifies the vertical distance between the bottom of the template and the area to be extracted.

Type the character Y followed by a space. For <Units>, type the vertical distance from the bottom of the template to the beginning of the area to be extracted.

A Y value of 0 represents a location flush along the bottom of the template. Increasing the value of Y locates the area to be extracted the defined distance above the bottom of the template.

The Y value is expressed in unitized format if the unit type is different from the default unit type defined in the Units element. Possible <Unit Type> values are listed above.

The default value for Y is 0.

Width <Unit><Unit Type>

This value identifies the width of the portion to be extracted (starting at the X, Y coordinates).

Type the word Width followed by a space. For <Units>, type the s width of area to be extracted from the template. This measurement is the X (horizontal) dimension of the area to be extracted.

This default value for Width is equal to the width of the template.

Heights <Units ><Unit Type>

The value identifies the height (length) of the portion to be extracted (starting at the X, Y coordinates).

Type the word Height followed by a space. For <Units >, type the height of the area to be extracted from the template. This measurement is the Y (vertical) dimension of the area to be extracted.

This value is expressed in unitized format if the unit type is different from the default unit type defined in the Units element. Possible <Unit Type>values are listed above.

The default value for Height is equal to the width of the template.

Example

[PageDescriptionLanguageFile]
ps1
ps2
[ps1]
File Path=/mydir/mypsfile.ps
Templates=temp1, temp2
PSScale=0.8
[ps2]
File Path=/mydir/mysubtmp.ps
SubTemplate=True
Templates=temp3, temp4, temp5, temp6
SubTemplate Area-X 1 in Y 2 in Width 3 in Height 4 in This example depicts two PDL files.

File ps1 is a "normal" PDL file containing two "normal" templates

File ps2 is identified as a subtemplate file (SubTemplate=True). The same area (SubTemplateArea) on each template is ps2 will be defined as a subtemplate. This area represents a 3-inch wide by 4-inch long portion starting from 1 inch to the right and 2 inches above the lower left corner of the template. Since no Name <SubName> value is given, each subtemplate will take the official name of its template.

[Template Tag]

A user-defined tag name for a group that provides information about a template and corresponds to a descriptive tag that you create within the Templates element.

Syntax [Template Tag]
<VariScript rendering parameters>
New Name=<Template New Name>
Sub Template=
Sub Template Area=

See Also Templates

Remarks Optional.

A separate [Template Tag] group is required for each descriptive tag listed in the Templates element which you will identify as a subtemplate or assign a new template name or a template-level marketing parameter.

Explanation [Template Tag]

Take the descriptive tag within the TempleNames element and write it here as a group name within brackets [].

<VariScript rendering parameters>

Define a value for any VariScript rendering parameter which will be applied to this specific template. These elements include PSAnchor, PSLength, PSNPlanes, PSOrientation, PSResX, PSResY, PSRotation, PSScale, PSScaleX; PSScale Y, PSTranslater X, PSTranslate Y, and PSWidth. See the element descriptions in Chapter 4.

A rendering parameter applied within this group has the highest precedence. It will override the definition of the same parameter in the configuration file, in the [Job-Setup] group, and in the [PDLFileTag] group.

NewName=
See the NewName element description
SubTemplate=
See the SubTemplate element description.
SubTemplate Area=
See the SubTemplate Area element description.
Example [TempA]
  NewName=lotto_tikt
  PSScale=0.8125
  SubTemplate=True Newname
  An element that defines a new name for the specified template. This new name overrides the system-generated default template name or the template name that you may have placed directly on this template within the PDL file.
Syntax NewName=<TemplateNewName>
Remarks Optional.
  The template receives its name in one of three ways:
    The system automatically generates a default template name. (lowest precedence)
    You can physically name the template when you are working in your design application (for example, QuarkXPress) before you output to a PDL file.
    You can define a new template name in the Job Ticket within the NewName element. (highest precedence)
  VariScript will recognize only one template name for each template. Therefore, a template name assigned by using a method of higher precedence will overwrite a name of lower precedence. For example, a name defined directly on the template will overwrite the system-generated default, and, in turn, be overwritten by a name defined using the NewName element.
  The NewName element does NOT have a default value.
Explanation <TemplateNewName>
  Specify the template's new name.
Example NewName=lotto_tikt Subtemplate
  An element that identifies this templates as being a subtemplate.
Syntax SubTemplate={True|False}
Remarks Optional.
  A subtemplate is a template or PDL page that is used as an object to be inserted on another page.
  The default value for SubTemplate is False.
Explanation {True|False}
  If this template is to be identified as a subtemplate, type True.
  If this template is NOT a subtemplate, type False.
Example SubTemplate=True While the forms of apparatus and procedure herein described constitute preferred embodiments of the invention, it is to be understood that the invention is not limited to such precise embodiments, and that variations can be made therein without departing from the scope of the invention.

What is claimed is:

1. A computer implemented method for generating a plurality of bitmaps suitable for high-speed printing comprising the steps of:
   a) providing a page description code specification, the page description code specification defining a data area and at least one graphical attribute associated with the data area, the graphical attribute defining the appearance of at least a portion of data associated with the data area;
   b) interpreting the page description code specification, and during the interpretation, identifying the data area defined by the page description code specification;
   c) storing the graphical attribute associated with the data area upon identification of the data area in step (b);
   d) retrieving an object bitmap;
   e) generating a bitmap suitable for high-speed printing, the step of generating the bitmap suitable for high-speed printing including a step of applying the stored graphical attribute to the object bitmap; and
   g) repeating steps (d) and (e) to create a plurality of bitmaps suitable for high-speed printing, whereby the stored graphical attribute is applied repeatedly in the generation of the plurality of the bitmaps suitable for high-speed printing.

2. The computer implemented method of claim 1, wherein:
   at least a portion of the page description code specification includes a static data area; and
   the step (e) of generating a bitmap suitable for high-speed printing further includes the steps of:
   processing the portion of the page description code including the static data area to generate a template bitmap;
   storing the template bitmap; and
   after applying the stored graphical attribute to the object bitmap, merging the object bitmap with a clean copy of the template bitmap.

3. The computer implemented method of claim 2, further comprising the step of, prior to the retrieving step (d), processing a page description code segment defining the object bitmap.

4. The computer implemented method of claim 3, wherein the page description code segment defines one or more bitmap images.

5. The computer implemented method of claim 4, wherein the one or more bitmap images are taken from a group consisting of: one or more digital images, one or more graphs; one or more charts; one or more logos; and a combination of one or more digital images, graphs, charts and logos.

6. The computer implemented method of claim 1, further comprising the step of, prior to the retrieving step (a), processing a page description code segment defining the object bitmap.

7. A computer implemented method for generating a plurality of bitmaps suitable for high-speed printing comprising the steps of:
   a) providing a template page description code section defining at least a primary data area and at least one graphical attribute associated with the primary data area, the graphical attribute defining the appearance of at least a portion of data associated with the primary data area;
   b) providing a plurality of sub-template page description code sections, each defining at least a respective secondary data area;
   c) processing the template page description code section to generate a template bitmap, and during the processing, identifying the primary data area defined by the template page description code section;
   d) storing the graphical attribute associated with the primary data area upon identification of the first data area in step (c);

e) processing the plurality of sub-template page description code sections to generate a corresponding plurality of sub-template bitmaps;

f) retrieving a sub-template bitmap from the plurality of sub-template bitmaps;

g) applying the stored graphical attribute to the retrieved sub-template bitmap to generate a merging bitmap;

h) merging the template bitmap with the merging bitmap to generate a merged bitmap; and i) repeating steps (f)-(h) for at least the remaining sub-template bitmaps, whereby the stored graphical attribute is applied repeatedly to generate a plurality of the merged bitmaps.

8. The computerized method of claim 7, wherein the graphical attribute defines, at least in part, the location where the merging bitmap is to be merged with respect to the template bitmap.

9. The computerized method of claim 8, wherein step (g) further includes the step of applying additional graphic attributes to control the size of the merging bitmap.

10. The computerized method of claim 9, wherein the additional graphic attributes are taken from an external job file.

11. A method for generating a plurality of bitmaps comprising the steps of:

a) providing a template page description language specification including, at least in part, template data and associated graphic attributes defining how the template data is to appear on a printed page, the template specification including at least one sub-template identifier;

b) providing sub-template bitmap data, external to the template specification;

c) processing the template data and associated graphic attributes to generate template bitmap data;

d) identifying the sub-template identifier in the template specification and, upon identifying the sub-template identifier, associating the sub-template identifier with the sub-template bitmap data; and e) repeatedly merging copies of the sub-template bitmap data with copies of the template bitmap data to produce a plurality of merged bitmaps.

12. The method of claim 11, wherein:

the sub-template bitmap data is one of a plurality of sub-template bitmap data segments; and the step of associating the sub-template identifier with the sub-template bitmap data includes the step of associating variable data associated with the sub-template identifier as distinguishing the sub-template bitmap data from the plurality of sub-template bitmap data segments.

13. The method of claim 12, wherein the variable data is accessed from a variable data source external to the template specification and the plurality of sub-template bitmap data segments.

14. The method of claim 13, wherein the variable data source is a variable data file.

15. The method of claim 11, wherein:

the template specification includes graphic attributes associated with the sub-template identifier defining, at least in part, how sub-template bitmap data is to appear on a printed page; and the merging steps include the step of repeatedly applying the graphic attributes associated with the sub-template identifier to the copies of the sub-template bitmap data being merged with the copies of the template bitmap data.

16. The method of claim 15, wherein associations made in the associating step are defined, at least in part, by a job file external to the template specification and the sub-template bitmap data.

17. The method of claim 16, wherein:

the job file includes at least one additional graphic attribute defining, at least in part, how sub-template bitmap data is to appear on a printed page; and the merging step includes the step of repeatedly applying the additional graphic attribute included in the job file to the copies of the sub-template bitmap data being merged with the copies of the template bitmap data.

18. The method of claim 15, wherein the graphic attributes include an attribute defining, at least in part, the location where the sub-template bitmap data is to appear on the printed page.

19. The method of claim 11, wherein associations made in the associating step are defined, at least in part, by a job file external to the template specification and the sub-template bitmap data.

20. The method of claim 19, wherein:

the job file includes at least one graphic attribute defining, at least in part, how sub-template bitmap data is to appear on a printed page; and the merging step includes the step of repeatedly applying the graphic attribute included in the job file to the copies of the sub-template bitmap data being merged with the copies of the template bitmap data.

21. The method of claim 20, wherein the graphic attribute defines a portion of the copied sub-template bitmap data to be merged with the copies of the template bitmap data.

22. The method of claim 21, wherein the attribute defines the size and location of a portion of the copied sub-template bitmap data.

* * * * *